(12) United States Patent
Hisatsugu

(10) Patent No.: US 10,042,437 B2
(45) Date of Patent: Aug. 7, 2018

(54) INPUT DEVICE

(71) Applicant: DENSO CORPORATION, Kariya, Aichi-pref. (JP)

(72) Inventor: Shinsuke Hisatsugu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 128 days.

(21) Appl. No.: 15/032,558

(22) PCT Filed: Oct. 16, 2014

(86) PCT No.: PCT/JP2014/005243
§ 371 (c)(1),
(2) Date: Apr. 27, 2016

(87) PCT Pub. No.: WO2015/064038
PCT Pub. Date: May 7, 2015

(65) Prior Publication Data
US 2016/0259429 A1    Sep. 8, 2016

(30) Foreign Application Priority Data

Oct. 30, 2013 (JP) .................................. 2013-225902

(51) Int. Cl.
| | |
|---|---|
| G06F 3/0338 | (2013.01) |
| G05G 9/047 | (2006.01) |
| G06F 3/0354 | (2013.01) |
| G06F 3/01 | (2006.01) |
| G01C 21/36 | (2006.01) |

(52) U.S. Cl.
CPC ........... *G06F 3/0338* (2013.01); *G05G 9/047* (2013.01); *G06F 3/016* (2013.01); *G06F 3/03548* (2013.01); *G01C 21/3664* (2013.01)

(58) Field of Classification Search
CPC .... G06F 3/0338; G06F 3/03548; G06F 3/016; G05G 9/047; G01C 21/3664
See application file for complete search history.

(56) References Cited

U.S. PATENT DOCUMENTS

| | | | | |
|---|---|---|---|---|
| 6,097,114 A | * | 8/2000 | Hazelton | ............. G03F 7/70758 310/12.06 |
| 6,747,631 B1 | * | 6/2004 | Sakamaki | ................. G01L 1/14 345/157 |

(Continued)

FOREIGN PATENT DOCUMENTS

| | | |
|---|---|---|
| JP | 2002524009 A | 7/2002 |
| JP | 3997872 B2 | 10/2007 |

(Continued)

OTHER PUBLICATIONS

U.S. Appl. No. 14/784,428, filed Oct. 14, 2015, Hisatsugu.

*Primary Examiner* — Christopher E Leiby
(74) *Attorney, Agent, or Firm* — Harness, Dickey & Pierce, P.L.C.

(57) ABSTRACT

An input device includes: at least two coil bodies that are held by a holding body; and at least two magnetic poles formation sections that are held by a moving body to be movable. The holding body holds each of the at least two coil bodies such that a winding direction of a wire in each of the at least two coil bodies extends along an operation plane; and such that an extension direction of the wire extending along a coil side surface is different from one another.

11 Claims, 16 Drawing Sheets

(56) References Cited

U.S. PATENT DOCUMENTS

| | | | |
|---|---|---|---|
| 2004/0056745 A1* | 3/2004 | Watanabe | G06F 3/016 335/220 |
| 2004/0059245 A1 | 3/2004 | Watanabe et al. | |
| 2009/0009481 A1* | 1/2009 | Yatsu | G06F 3/016 345/173 |
| 2011/0043447 A1 | 2/2011 | Inaba et al. | |

FOREIGN PATENT DOCUMENTS

| JP | 2011044005 A | 3/2011 |
|---|---|---|
| JP | 2011227734 A | 11/2011 |

* cited by examiner

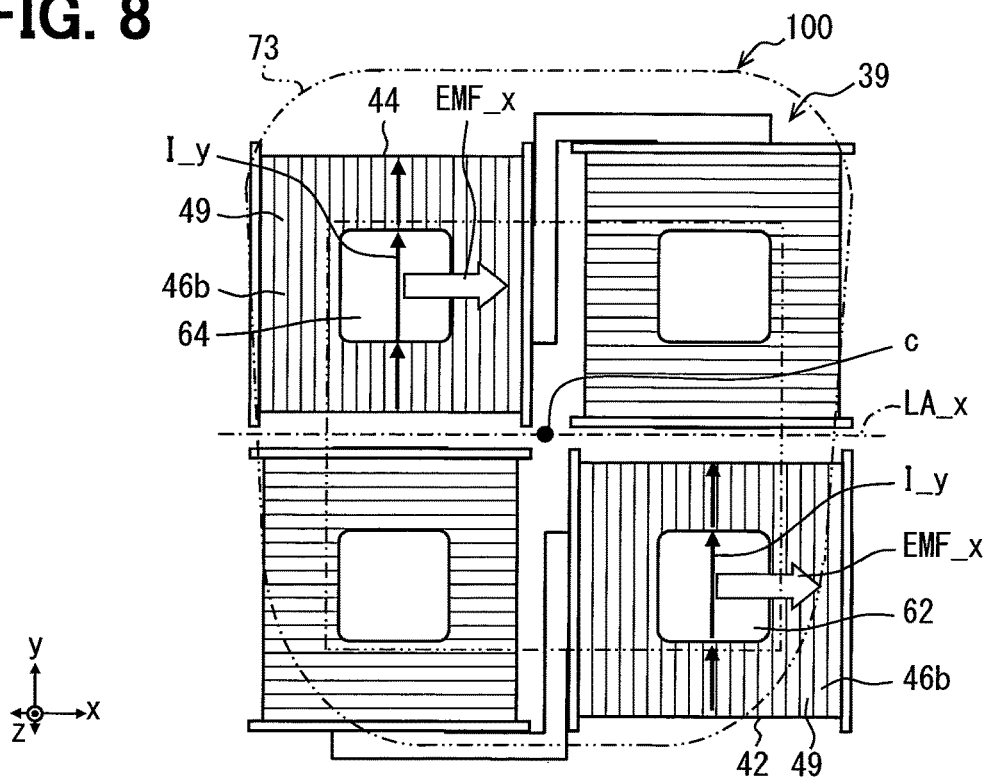
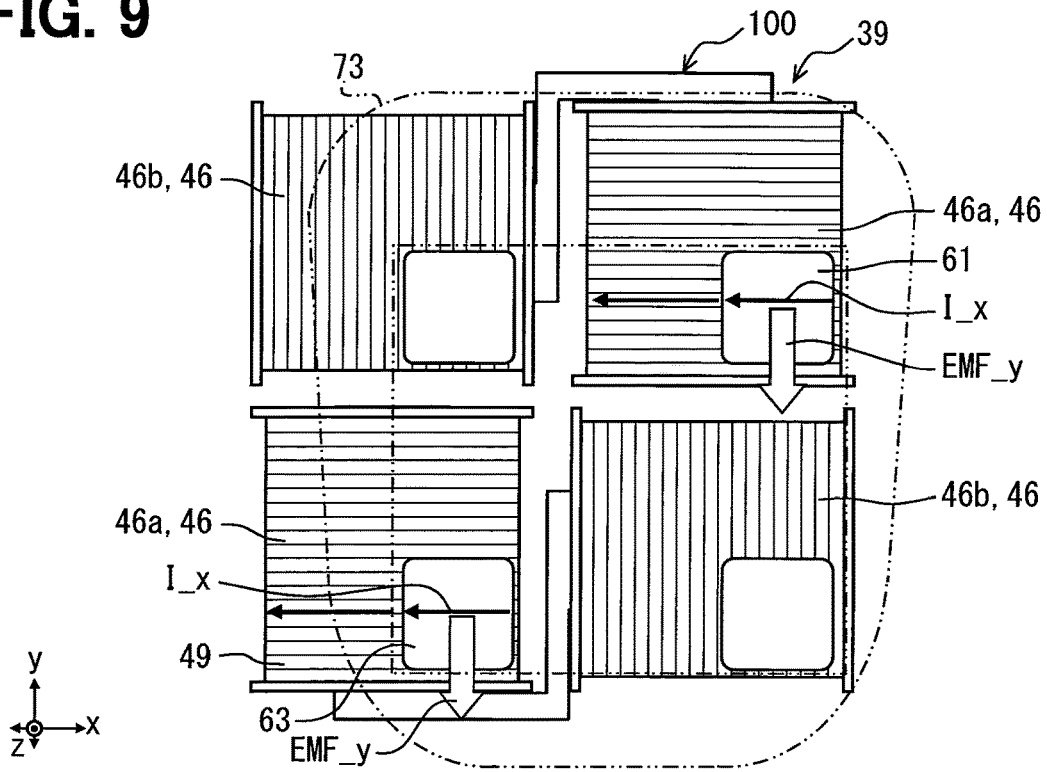

INPUT DEVICE

CROSS REFERENCE TO RELATED APPLICATIONS

This application is a U.S. National Phase Application under 35 U.S.C. 371 of International Application No. PCT/JP2014/005243 filed on Oct. 16, 2014 and published in Japanese as WO 2015/064038 A1 on May 7, 2015. This application is based on and claims the benefit of priority from Japanese Patent Application No. 2013-225902 filed on Oct. 30, 2013. The entire disclosures of all of the above applications are incorporated herein by reference.

TECHNICAL FIELD

This disclosure relates to an input device in which an operation force is inputted.

BACKGROUND ART

Patent Literature 1 discloses, as an actuator used for an input device, a configuration having four magnets and four coils. The magnets are held by a first yoke plate such that the polarities on the side facing coils alternate each other. On the other hand, the coils are held by a second yoke plate so as to face two of the four magnets in a z-axial direction. In each coil, the direction of a winding axis around which wire is wound is the z-axial direction.

Additionally, the second yoke plate is provided so as to be movable relative to the first yoke plate, and is fixed to a pseudo-touch exhibiting member, which is input by a user's operation. With such a configuration, electromagnetic forces in the x-axial direction and y-axial direction are generated between the coils and magnets by applying current to the wires. Accordingly, the pseudo-touch exhibiting member can make a user feel an operation reaction force of arbitrary magnitude.

In the configuration of the Patent Literature 1, a portion for generating an operation reaction force between the wire forming each coil and the corresponding magnet is referred to as an effective wire portion. In order to ensure the magnitude of electromagnetic force acting on the second yoke plate as an operation reaction force, the effective wire portions of the two coils have to be opposed to one magnet in the z-axial direction even when the second yoke plate moves maximally relative to the first yoke plate. For this reason, it is more difficult to reduce the size of each magnet, which has to be kept opposed to the effective wire portions of the two coils, than the case of reducing the size of coil.

PRIOR ART LITERATURES

Patent Literature

Patent Literature 1: JP-3997872-A

SUMMARY OF INVENTION

This disclosure has been proposed in view of the foregoing difficulties, and an object thereof is to provide an input device that reduces the size of each of magnetic-pole formation sections such as magnets and ensures the magnitude of an operation reaction force that can be generated.

An input device, in which an operation force in a direction along an imaginary operation plane is inputted, includes: at least two coil bodies that are respectively wound by a wire to which current is applied, and are arranged such that the at least two coil bodies respectively have a coil side surface, which is configured by the wire, along the operation plane; a holding body that holds the at least two coil bodies such that a winding direction axis of the wire in each of the at least two coil bodies is oriented along the operation plane, and such that an extension direction of the wire extending along the coil side surface is different from one another; at least two magnetic pole formation sections that respectively have an opposing face, which is respectively opposed to the coil side surface in a z-axial direction orthogonal to the operation plane, and respectively generate an electromagnetic force in a direction different from one another between each of the at least two magnetic pole formation sections and each of the at least two coil bodies by applying the current to the wire; and a mobile body that holds the at least two magnetic pole formation sections arranged so as to define predetermined spacing between the opposing face and the coil side surface correspondingly, and is arranged so as to be movable relative to the holding body with a state where the opposing face is opposed to the coil side surface correspondingly.

The magnetic-pole formation section has opposing faces, which are counter to the coil side-surfaces in the z-axial direction orthogonal to the operation plane, and generates electromagnetic forces in different directions between the opposing faces and the coil bodies by the application of current to each wire. The mobile body holds each magnetic-pole formation section so as to define a predetermined empty space between each opposing face and the corresponding coil side-surface, and is provided so as to be movable relative to the holder while a state in which the opposing face is opposed to the corresponding coil side-surface is maintained.

The disclosure provides an input device which can reduce the size of a magnetic-pole generating section and ensure the magnitude of an operation reaction force that can be generated.

BRIEF DESCRIPTION OF DRAWINGS

The above and other objects, features and advantages of the present disclosure will become more apparent from the following detailed description made with reference to the accompanying drawings. In the drawings:

FIG. 8 is a schematic view illustrating the principle by which an electromagnetic force in the x-axial direction is generated in the reaction force generating section;

FIG. 9 is a schematic view illustrating that an electromagnetic force can be generated, even with the movable part moved rightward and backward;

EMBODIMENTS FOR CARRYING OUT INVENTION

A plurality of embodiments according to this disclosure will be described below with reference to the drawings. In the embodiments, compositional elements corresponding to one another are denoted by identical reference signs and duplicate explanation thereof will be omitted. In each embodiment, a part of a configuration is described, another preceding embodiment may be applied to the other portions of this configuration. Additionally, not only a combination of configurations specified in the descriptions of embodiments, but also the configurations of embodiments can partially be combined even if they are not specified, provided there is no disadvantage in the combination in particular. Any unspecified combination of the configurations described in embodiments and modifications is assumed by explanation below to have been disclosed.

(First Embodiment)

Figure 1:
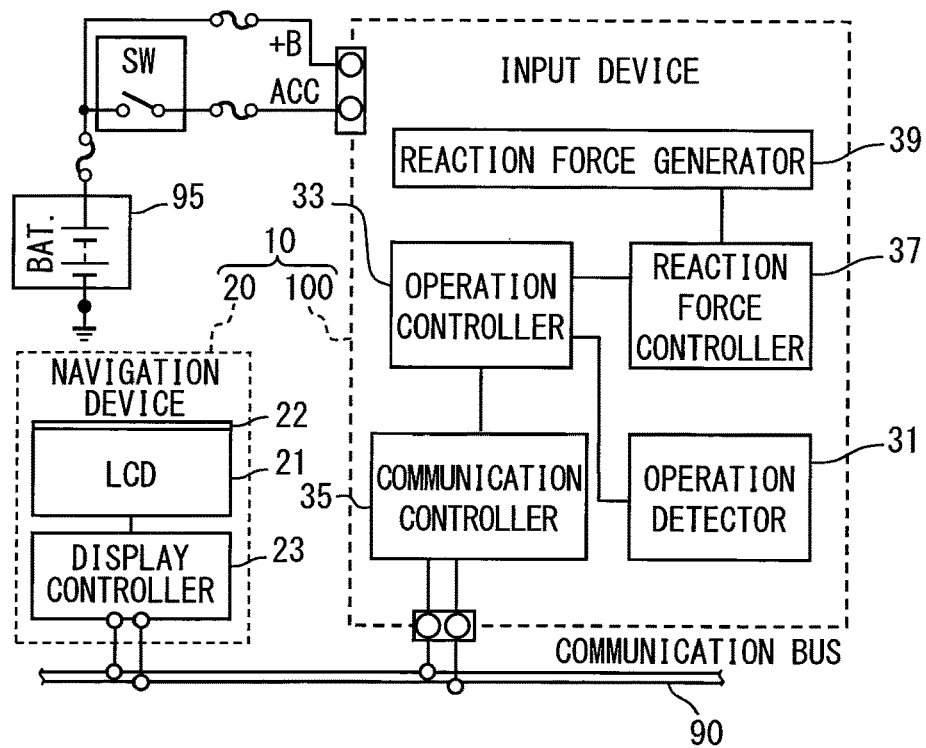
FIG. 1 is a diagram illustrating the configuration of a display system having an input device according to a first embodiment of this disclosure.
Figure 2:
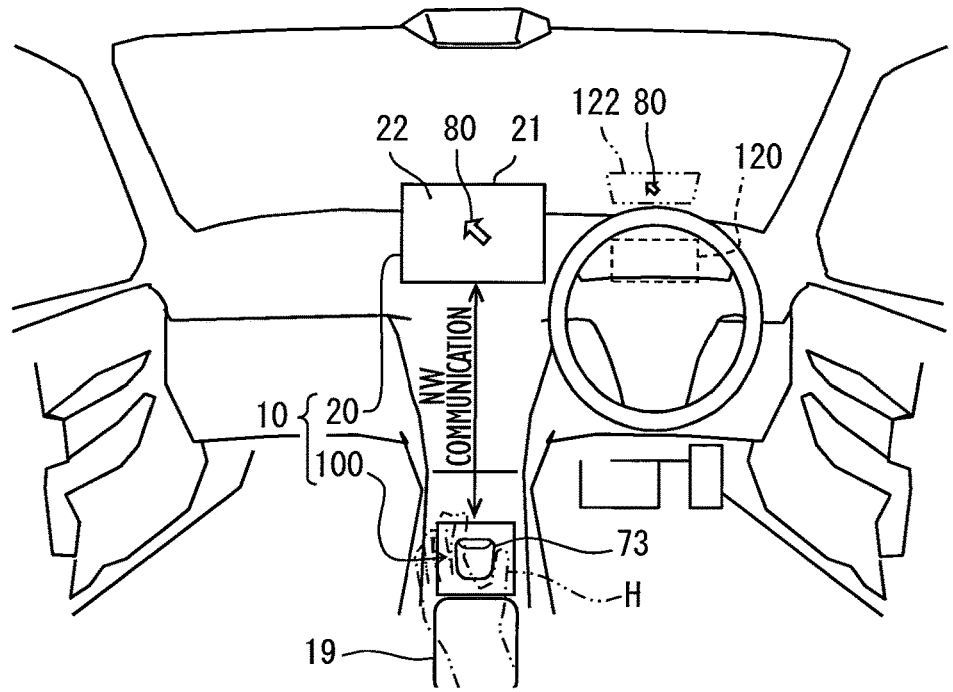
FIG. 2 is a diagram illustrating the arrangement of the input device in a vehicle cabin.

An input device 100 according to a first embodiment of this disclosure shown in FIG. 1 is mounted in a vehicle, and composes a display system 10 together with a display unit in a vehicle cabin, for example, a navigation device 20, a head-up display 120 (see FIG. 2), or the like. As shown in FIG. 2, the input device 100 is installed in a position adjacent to a palm rest 19 on the center console of the vehicle, and exposes an operation knob 73 in a range of easy reach of an operator's hand. When an operation force is input with, for example, an operator's hand H, this operation knob 73 is displaced in the direction of the input operation force.

The navigation device 20, which is one of the display devices in the vehicle cabin, is installed in an instrument panel of the vehicle and exposes a display screen 22 toward the driving seat. On the display screen 22, a plurality of icons with which predetermined functions are associated, a pointer 80 for selecting an arbitrary icon, and so on are displayed. When an operation force in a horizontal direction is input to the operation knob 73, the pointer 80 moves on the display screen 22, in a direction corresponding to the direction in which the operation force is input. As shown in FIGS. 1, 2, the navigation device 20 is connected to a communication bus 90 and is network-communicatable with the input device 100, and so on. The navigation device 20 has a display controller 23 that draws an image displayed on the display screen 22, and a liquid crystal display 21 that continuously displays on the display screen 22 an image drawn by the display controller 23.

Configurations of the input device 100 will be described in detail. As shown in FIG. 1, the input device 100 is connected to the communication bus 90, an external battery 95, and so on. Through the communication bus 90, the input device 100 is communicatable with the navigation device 20 located away from the device 100. Additionally, by the battery 95, the input device 100 is supplied with power required for the actuation of each configuration.

The input device 100 is electrically composed of a communication controller 35, an operation detector 31, a reaction force generator 39, a reaction force controller 37, an operation controller 33, and so on.

The communication control section 35 outputs information, processed by the operation controller 33, to the communication bus 90. Additionally, the communication controller 35 acquires information output to the communication bus 90 from another on-vehicle device, and outputs the information to the operation controller 33. The operation detector 31 detects the position of an operation knob 73 (see FIG. 2) moved by the input of an operation force. The operation detector 31 outputs operation information indicating the detected position of the operation knob 73, to the operation controller 33.

The reaction force generator 39 is an actuator, such as a voice coil motor, configured to cause the operation knob 73 to generate an operation reaction force. For example, when the pointer 80 (refer to FIG. 2) overlaps an icon on the display screen 22, the reaction force generator 39 applies an operation reaction force to the operation knob 73 (refer to FIG. 2), thereby making an operator feel the pseudo touch of the icon. The reaction force controller 37 is composed of a microcomputer and so on for performing, for example, various operations. On the basis of reaction force information acquired by the operation controller 33, the reaction force controller 37 controls the direction and magnitude of an operation reaction force applied to the operation knob 73 by the reaction force generator 39.

The operation controller 33 is composed of a microcomputer and so on for performing, for example, various operations. The operation controller 33 acquires operation information detected by the operation detector 31, and outputs the information to the communication bus 90 through the communication controller 35. Additionally, the operation controller 33 calculates the direction and magnitude of an operation reaction force applied to the operation knob 73 (refer to FIG. 2), and outputs the calculation result to the reaction force controller 37 as reaction information.

Figure 3:
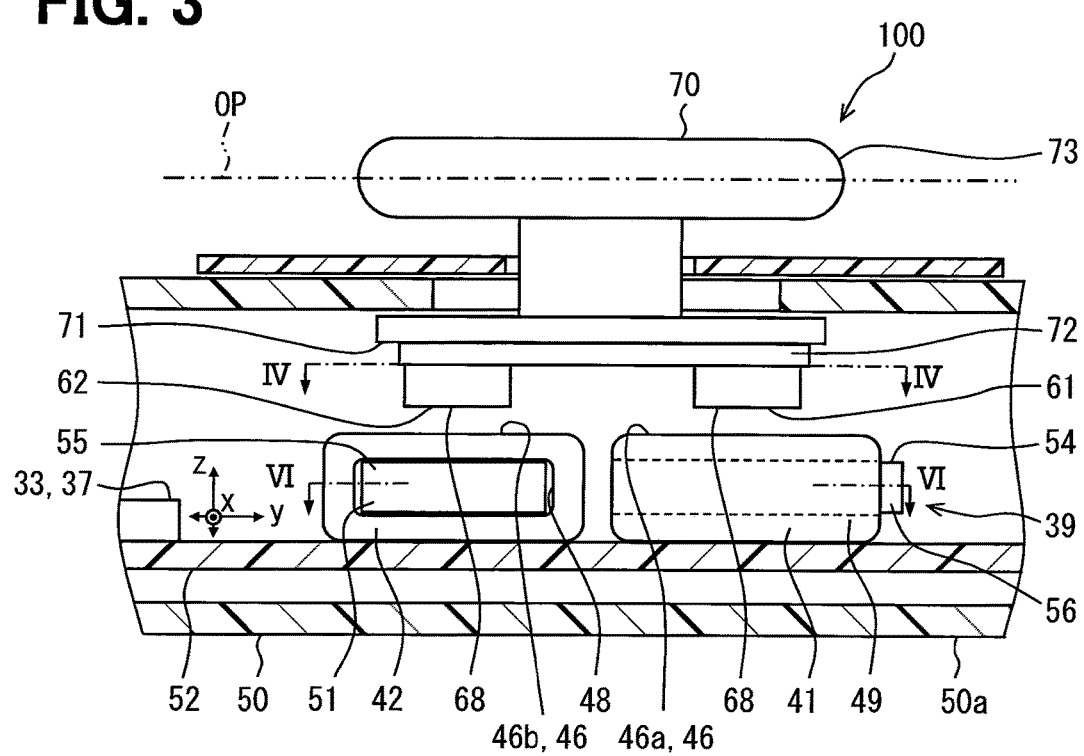
FIG. 3 is a cross-sectional view illustrating the mechanical configuration of the input device.

As shown in FIG. 3, the input device 100 is mechanically composed of a movable part 70, a fixed part 50, and so on.

The movable part 70 has a movable yoke 72, which will be described later. The movable part 70 is provided with a knob base 71 holding the movable yoke 72, and the operation knob 73 described above. The movable part 70 is provided so as to be movable in an x-axis direction and a y-axis direction along an imaginary operation plane OP relative to the fixed part 50. The range in which the movable part 70 is movable in the x-axis direction and the y-axis direction are regulated in advance by the fixed part 50. When the movable part 70 is released from an operation force applied thereto, the movable part 70 returns to its reference position.

The fixed part 50 has a housing 50a, a circuit board 52, and two fixed yokes 54, 55 (refer to FIG. 4) which will be described later. The housing 50a accommodates configurations, such as the circuit board 52 and the reaction force generator 39, and supports the movable part 70 such that the movable part 70 is relatively movable. The circuit board 52 is fixed in the housing 50a with the direction of the board face oriented along the operation plane OP. Mounted on the circuit board 52 are microcomputers composing the operation controller 33, the reaction force controller 37, and so on.

Next, the configuration of the reaction force generator 39 used for reaction force feedback in the input device 100 will be further described with reference to FIGS. 3 to 6. The reaction force generator 39 is composed of four coils 41 to 44, four magnets 61 to 64, fixed yokes 54, 55, a movable yoke 72, and so on.

Figure 4:
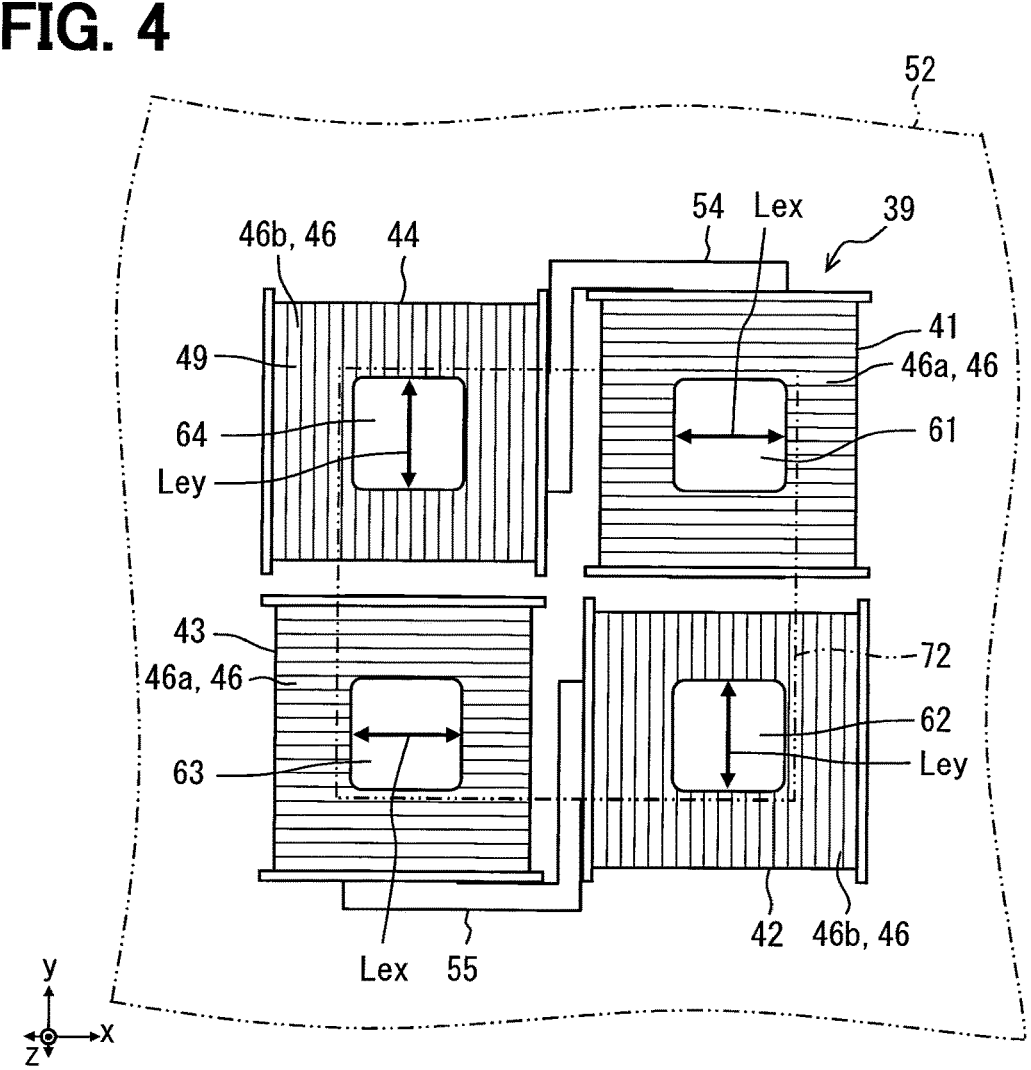
FIG. 4 is a schematic view of the configuration of a reaction force generating section, and is a cross-sectional view taken along IV-IV line in FIG. 3.
Figure 5:
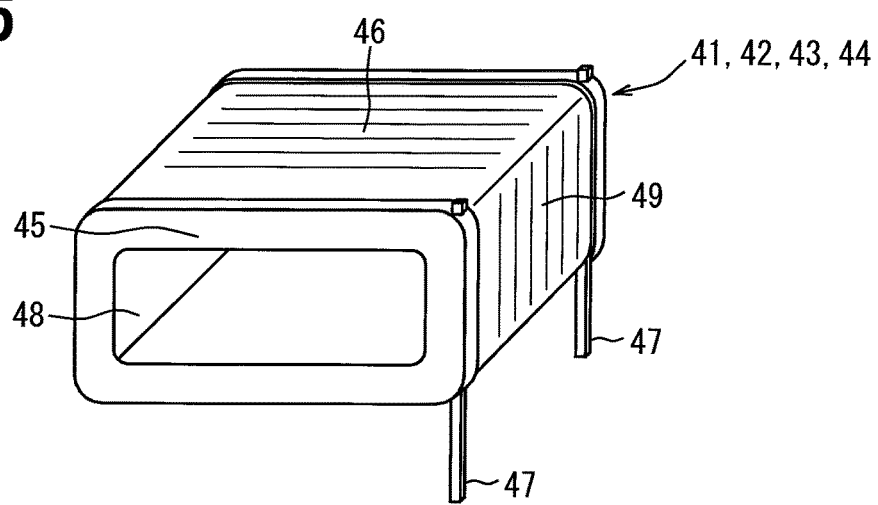
FIG. 5 is a perspective view of coils.

As shown in FIG. 5, each of the coils 41 to 44 is formed by winding a linear material, namely a wire 49, which is made of a nonmagnetic material such as copper, around a cylindrical bobbin 45. In each of the coils 41 to 44, a cross-section orthogonal to the direction of the winding axis of the wire 49 has a rectangular shape. The wire 49 is wound until each of the coils 41 to 44 has a thickness equal to about 3 mm. In each of the coils 41 to 44, an accommodation chamber 48 extending in the direction of the winding axis is formed on the inner periphery side of the wound wire 49. Each of the coils 41, 44 is provided with a pair of leads 47. These leads 47 are connected to the circuit board 52 shown in FIGS. 3, 4. Accordingly, each of the coils 41 to 44 is electrically connected to the reaction force controller 37. Current is individually applied to the wire 49 of each of the coils 41 to 44 by the reaction force controller 37.

The coils 41 to 44 are arranged in two lines in each of x-axial and y-axial directions with slight empty spaces among them. Each of the coils 41 to 44 is mounted on the circuit board 52 such that the direction of the winding axis of the wire 49 is oriented along the operation plane OP and parallel with the operation plane OR With such an arrangement, the wire 49 of each of the coils 41 to 44 forms a coil side-surface 46 (refer to also FIG. 5) along the operation plane OP. The coil side-surface 46 has an approximately quadrangular shape each side of which is along the x-axis or the y-axis. Among the coil side-surfaces 46, the coil side-surfaces 46 of the coils 41, 43 whose directions of the winding axes are oriented in the y-axial direction are referred to as first coil side-surfaces 46a. The coil side-surfaces 46 of the coils 42, 44 whose directions of the winding axes are oriented in the x-axial direction are referred to as second coil side-surfaces 46b. The wire 49 forming the first coil side-surface 46a extends along the x-axial direction. The wire 49 forming the second coil side-surface 46b extends along the y-axial direction. As described above, the first coil side-surfaces 46a and the second coil side-surfaces 46b differ from each other in the extending direction of each wire 49. Additionally, the first coil side-surfaces 46a and the second coil side-surfaces 46b are arranged in a zigzag manner such that coil side-surfaces 46 alternate each other in the x-axial direction and y-axial direction.

Each of the magnets 61 to 64 is of a neodymium or the like and has an approximately quadrangular plate shape. Each of the magnets 61 to 64 is mounted on the movable yoke 72 with the direction of each side of magnet being along the x-axis or y-axis. The magnets 61 to 64 are respectively movable relative to the coils 41 to 44 together with the movable part 70. The magnets 61 to 64 are arranged in two lines in each of the x-axial and y-axial directions with slight empty spaces between them. Each of the magnets 61 to 64 has a opposing face 68 oriented toward the circuit board 52 in a state of being held on the movable yoke 72. Each opposing face 68 is opposed to one corresponding coil side-surface 46 in a z-axial direction orthogonal to the operation plane OR When the movable part 70 has been returned to the reference position, each opposing face 68 is located in the middle of the corresponding coil side-surface 46. A predetermined empty space is defined between one opposing face 68 and one coil side-surface 46. Each opposing face 68 has a substantially square shape and has a smooth flat face. Additionally, the polarities of the opposing faces 68, namely, N-pole and S-pole are arranged in a zigzag manner such that the polarities alternate each other in the x-axial direction and y-axial direction. The magnets 61 to 64 generate an electromagnetic force with the coils 41 to 44 to which current is applied.

Figure 6:
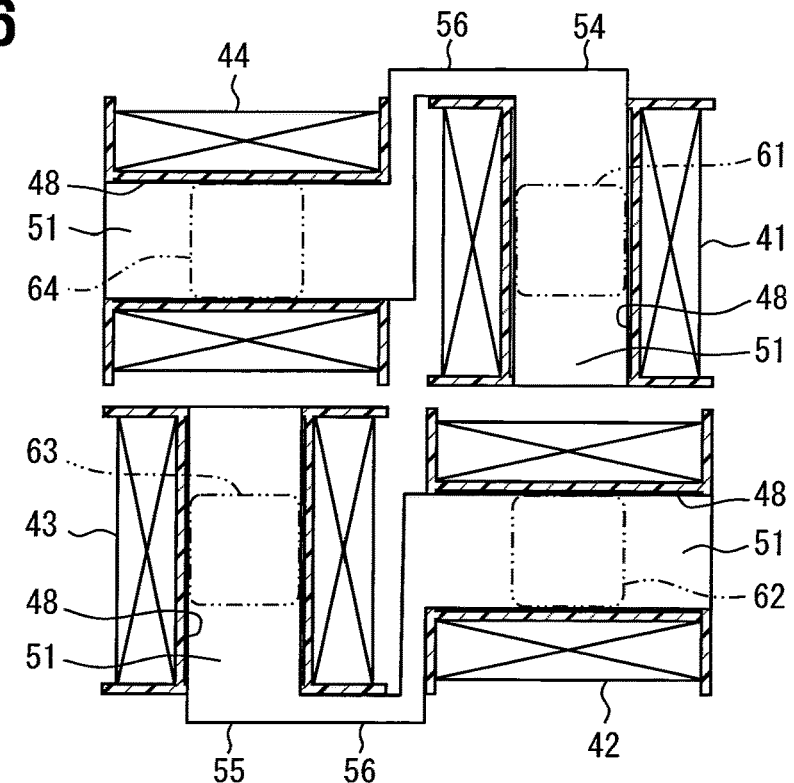
FIG. 6 is a diagram illustrating the shape of each fixed yoke, and is a cross-sectional view taken along VI-VI line in FIG. 3.

Each of the fixed yokes 54, 55 shown in FIGS. 3, 6 is formed of a magnetic material such as soft iron or an electromagnetic steel plate. Of the two fixed yokes 54, 55, one connecting the coils 41, 44 is referred to as a first fixed yoke 54, and the other connecting the coils 42, 43 is referred to as a second fixed yoke 55. Each of the fixed yokes 54, 55 is provided with two coil-side yoke parts 51 and a connection part 56. Each of the coil-side yoke parts 51 has a quadrangular prism shape and is inserted into the accommodation chamber 48, thereby collecting magnetic fluxes, generated by the magnets 61 to 64, on the coil side-surfaces 46. The connection part 56 connects the two coil-side yoke parts 51.

The coil-side yoke parts 51 of the first fixed yoke 54 are inserted into the respective accommodation chambers 48 of the coils 41, 44. The connection part 56 of the first fixed yoke 54 is bent in an L-shape along the coils 41, 44 and extends from the coil-side yoke part 51 accommodated in the coil 41 to the coil-side yoke part 51 accommodated in the coil 44. With this configuration, the first fixed yoke 54 forms a magnetic circuit that induces a magnetic flux from one of the magnets 61, 64 to the other. Thus, a magnetic flux passing through the coil side-surfaces 46a, 46b of the coils 41, 44 in the z-axial direction is reliably generated.

The coil-side yoke parts 51 of the second fixed yoke 55 are inserted into the respective accommodation chambers 48 of the coils 42, 43. The connection part 56 of the second fixed yoke 55 is bent in an L-shape along the coils 42, 43 and extends from the coil-side yoke part 51 accommodated in the coil 42 to the coil-side yoke part 51 accommodated in the coil 43. With this configuration, the second fixed yoke 55 forms a magnetic circuit that induces a magnetic flux from one of the magnets 62, 63 to the other. Thus, a magnetic flux passing through the coil side-surfaces 46b, 46a of the coils 42, 43 in the z-axial direction is reliably generated.

Similarly to the fixed yokes 54, 55, the movable yoke 72 shown in FIGS. 3, 4 is formed of a magnetic material such as soft iron or an electromagnetic steel plate. The movable yoke 72 is disposed between the knob base 71, provided on the movable part 70, and the magnets 61 to 64. The movable yoke 72 forms a magnetic circuit, which induces a magnetic flux generated by each of the magnets 61 to 64, together with the fixed yokes 54, 55, thereby inhibiting a leak of magnetic flux to the outside.

In the input device 100 with the foregoing configuration, the reaction force generator 39 can generate electromagnetic forces in different directions. Specifically, the reaction force generator 39 can generate an electromagnetic force EMF_x acting in the x-axial direction and an electromagnetic force EMF_y acting in the y-axial direction, and can individually control the electromagnetic forces EMF_x and EMF_y. The principle by which the reaction force generator 39 causes operation reaction force to act on the operation knob 73 will now be described with reference to FIGS. 7 to 9.

Figure 7:
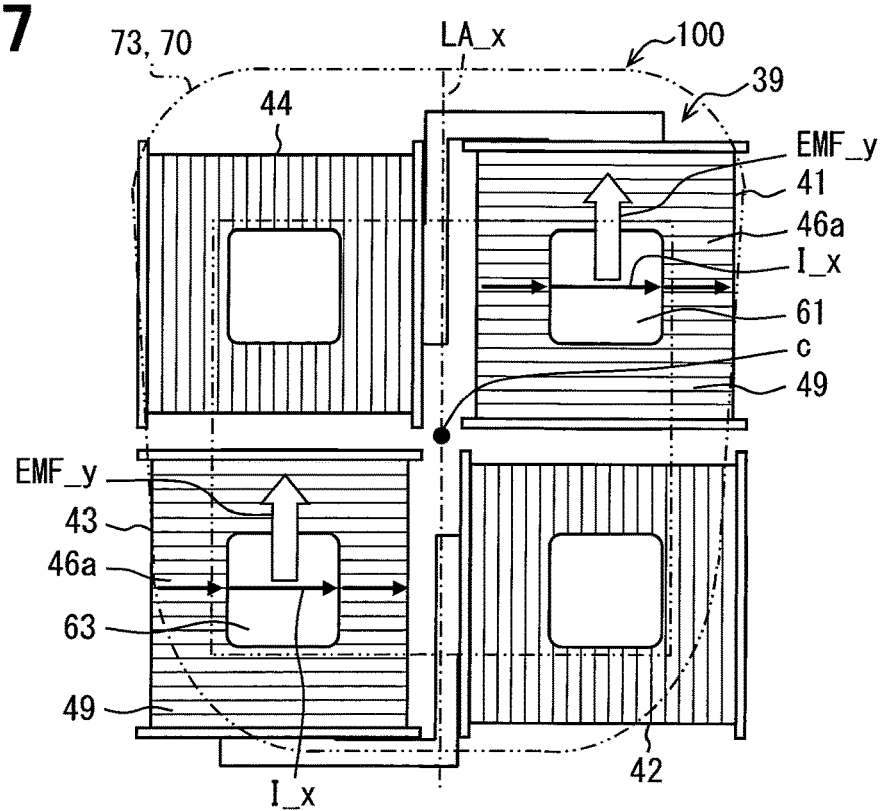
FIG. 7 is a schematic view illustrating the principle by which an electromagnetic force in the y-axial direction is generated in the reaction force generating section.

FIG. 7 shows a case where an operation reaction force in the y-axial direction is caused to be generated with the operation knob 73 having returned to the reference position. In this case, by means of the reaction force controller 37 (refer to FIG. 1), current I_x is applied to the wire 49 of each of the two coils 41, 43 forming the first coil side-surfaces 46a. This current I_x flows in the x-axial direction, which is a direction in which the wire 49 of each first coil side-surface 46a extends. When the current I_x is caused to flow in each first coil side-surface 46a in the same direction, for example, the direction from the coil 44 to the coil 41 along the x-axis (hereinafter, referred to as rightward), an electromagnetic force EMF_y in the y-axial direction substantially orthogonal to the x-axial direction is generated between the coil 41, 43 and the corresponding magnet 61, 63. In the first embodiment, under the conditions described above, an electromagnetic force EMF_y in a direction from the coil 42 to the coil 41 along the y-axis (hereinafter, referred to as forward) acts on each of the magnets 61, 63. A resultant force of these electromagnetic forces EMF_y serves as an operation reaction force in the y-axial direction.

The direction in which the current I_x flowing in each first coil side-surface 46a is reversed to obtain a direction from the coil 41 to the coil 44 along the x-axis (hereinafter, referred to as leftward), the direction of the electromagnetic force EMF_y is also reversed. As a result, the reaction force generator 39 can generate an electromagnetic force EMF_y in the direction from the coil 41 to the coil 42 along the y-axis (hereinafter, backward).

FIG. 8 shows a case where an operation reaction force in the x-axial direction is generated with the operation knob 73 having returned to the reference position. In this case, by means of the reaction force controller 37 (refer to FIG. 1), current I_y is applied to the two coils 42, 44 forming the second coil side-surfaces 46b. This current I_y flows in the y-axial direction, which is a direction in which the wire 49 of each second coil side-surface 46b extends. By causing forward current I_y to flow in each second coil side-surface 46b, a rightward electromagnetic force EMF_x acts on each of the magnets 62, 64. A resultant force of these electromagnetic forces EMF_x serves as an operation reaction force in the x-axial direction. By reversing the direction of current I_y flowing in each second coil side-surface 46b, a leftward electromagnetic force EMF_x is generated.

As described above, in the reaction force generator 39, electromagnetic forces EMF_x and EMF_y to be generated are controlled by adjusting current applied to each coil 49. Accordingly, the reaction force generator 39 can generate an operation reaction force in any direction along the operation plane OP (refer to FIG. 3) by combining these electromagnetic forces EMF_x and EMF_y.

Next, a case where the operation knob 73 is moved backward and rightward will be described with reference to FIG. 9. In this case, too, the opposing face 68 (refer to FIG. 3) is kept counter to the corresponding coil side-surface 46 in the z-axis direction. Accordingly, by causing leftward current I_x to flow in the wire 49 of each first coil side-surface 46a, a backward electromagnetic force EMF_y acts on each of the magnets 61, 63. As described above, even with the operation knob 73 stroked, the reaction force generator 39 can generate an operation reaction force in each direction along the operation plane OP (refer to FIG. 3). Additionally, regardless of the stroked position of the operation knob 73, the magnitude of operation reaction force that can be generated, can be maintained.

In the reaction force generator 39, the magnitude of an electromagnetic force that can be generated between a pair of coils and magnets is related to the length of the opposing face 68 (refer to FIG. 3) along the direction in which the wire 49 extends. Specifically, as the dimension of each of the magnets 61, 63 in the x-axial direction shown in FIG. 4 (hereinafter, referred to as an effective length Lex in the x-axial direction) increases, the electromagnetic force EMF_x that can be generated also increases. Similarly, as the dimension of each of the magnets 62, 64 in the y-axial direction (hereinafter, referred to as an effective length Ley in the y-axial direction) increases, the electromagnetic force EMF_y that can be generated also increases. Therefore, the effective lengths Lex, Ley in the respective axial directions, that is, the length of one side of each of the magnets 61 to 64, are specified according to the maximum values of required electromagnetic forces EMF_x, EMF_y (refer to FIGS. 7, 8). Even in a case where the movable part 70 (refer to FIG. 4) moves maximally in the axial direction, the sizes of the coil side-surfaces 46 of the coils 41 to 44 are specified so that the state in which the opposing faces 68 are counter to the respective coil side-surface 46 is maintained. Specifically, the length of one side of each of the coils 41 to 44 is equal to or greater than the total of the effective lengths Lex, Ley in the directions and the amounts of full stroke specified in the axial directions.

As in the first embodiment that has just been described above, in the configuration where the magnets 61 to 64 are moved relative to the fixed coils 41 to 44, it is enough for each of the opposing face 68 to be able to maintain the state of being counter to one corresponding coil side-surface 46. For this reason, the opposing face 68 can be formed smaller in area than the coil side-surface 46. Additionally, as long as the effective lengths Lex, Ley, described above, have been ensured even if the opposing face 68 is smaller than the coil side-surface 46, the magnitudes of the electromagnetic forces EMF_x, EMF_y that can be generated, can be ensured. Therefore, the input device 100 is realized, which reduces the size of each of the magnets 61 to 64, and ensures the magnitudes of electromagnetic forces EMF_x, EMF_y that can be generated.

Additionally, in the first embodiment, the entire opposing faces 68 of the magnets 61 to 64 overlap the coil side-surfaces 46 of the coils 41 to 44 in the z-axial direction, thus making it possible to contribute to the generation of a reaction force. Therefore, compared to a conventional configuration in which only part of each magnet overlaps corresponding coil in the z-axial direction, resulting in a wider area that do not contributed to the generation of reaction forces, the configuration described above can efficiently use the magnets 61 to 64 to generate a reaction force. With such an improvement in reaction force generation efficiency, the magnitude of an operation reaction force that can be generated can be kept high even if the magnets 61 to 64 are reduced in size.

Additionally, in the first embodiment, the directions in which the wires 49 forming the first coil side-surface 46*a* and second coil side-surface 46*b* extend are shifted by substantially 90° each other. Therefore, the electromagnetic forces EMF_x, EMF_y in the axial directions can be controlled separately by the coils 41, 43 or by the application of current to the coils 42, 44. Accordingly, satisfactory controllability for an operation reaction force is achieved. Furthermore, in a configuration in which two coils for generating electromagnetic force EMF_x in an axial direction and two coils for generating electromagnetic force EMF_y in an axial direction are provided, an operation reaction force that can be generated is obtained more easily.

Furthermore, in the first embodiment, the four coils 41 to 44 are arrayed in the x-axial direction and the y-axial direction, two for each, thereby arranging these coils 41 to 44 in a narrow area. With such an arrangement, the mounting area of each of the coils 41 to 44 occupying the circuit board 52 can be reduced. As a result, the input device 100 can be reduced in size.

Additionally, in the first embodiment, the first coil side-surface 46*a* and the second coil side-surface 46*b* are arranged in a zigzag manner. Therefore, the acting line LA_y of the resultant force of the electromagnetic forces EMF_y acting on the two magnets 61, 63 shown in FIG. 7 passes through or near the center c of the four magnets 61 to 64. Similarly, the acting line LA_x of the resultant force of the electromagnetic forces EMF_x acting on the two magnets 62, 64 shown in FIG. 8 passes through or near the center c of the four magnets 61 to 64. Thus, moment such as rotating the movable part 70 around the z-axis can reliably be reduced.

In addition to that, in the first embodiment, each of the coil side-faces 46 has a quadrangular shape. Accordingly, the range in which the opposing face 68 is opposed to the corresponding coil side face 46 can be increased in each of the x-axial direction and the y-axial direction. Therefore, while an increase in the size of each of the coils 41 to 44 is avoided, the amount of stroke of the movable part 70 in each axial direction can be ensured.

Additionally, in the first embodiment, the coil-side yoke parts 51 accommodated in the coils 41, 44 are connected by the connection part 56. Therefore, a magnetic circuit composed of the two magnets 61, 64, the first fixed yoke 54, and the movable yoke 72 is formed. Similarly, the coil-side yoke parts 51 accommodated in the coils 42, 43 are connected by the connection part 56. Therefore, a magnetic circuit composed of the two magnets 61, 64, the second fixed yoke 55, and the movable yoke 72 is formed. Thus, the magnitude of a magnetic flux passing through the coil side-surface 46 of each of the coils 41 to 44 can be kept high. Accordingly, even if each of the magnets 61 to 64 is reduced in size, generation of an operation reaction force can be ensured more easily.

The reaction force generator 39 in the first embodiment does not operate in such a manner that electromagnetic forces not used as an operation reaction force are generated by a plurality of magnets and these electromagnetic forces are offset by each other. In this way, the configuration in which only an electromagnetic force used in an operation reaction force substantially acts on each of the magnets 61 to 64 can reduce the magnitude required for the movable yoke 72 holding the magnets 61 to 64.

In the first embodiment, the coils 41 to 44 correspond to coil bodies, the coil-side yoke parts 51 correspond to magnetic yoke parts, and the circuit board 52 corresponds to a holding body. Additionally, the magnets 61 to 64 correspond to magnetic-pole formation sections and the movable yoke 72 corresponds to a mobile body.

(Second Embodiment)

Figure 10:
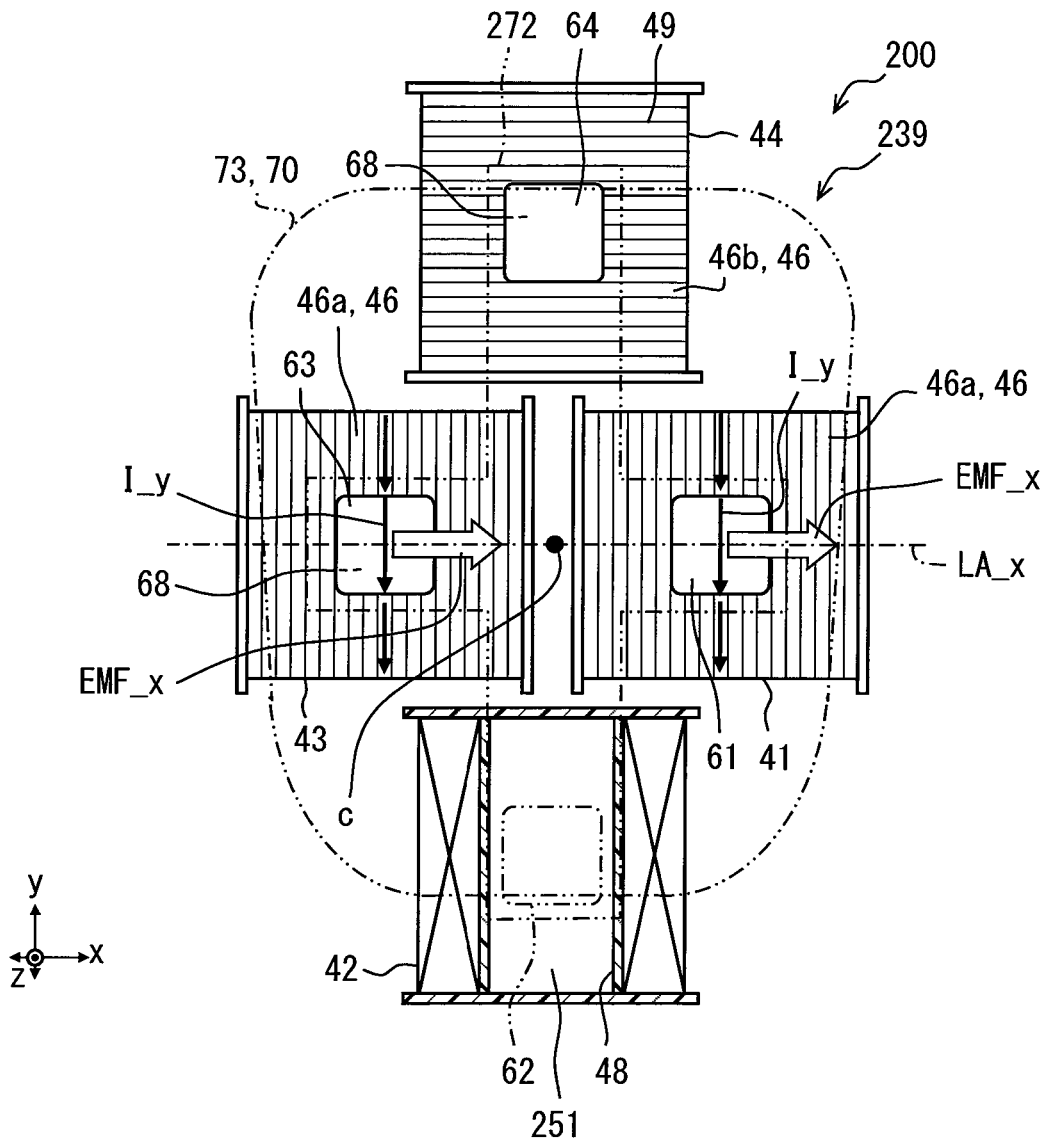
FIG. 10 is a schematic diagram of the configuration of a reaction force generating section according to a second embodiment, and illustrates the principle by which this reaction force generating section generates an electromagnetic force in the x-axial direction.
Figure 11:
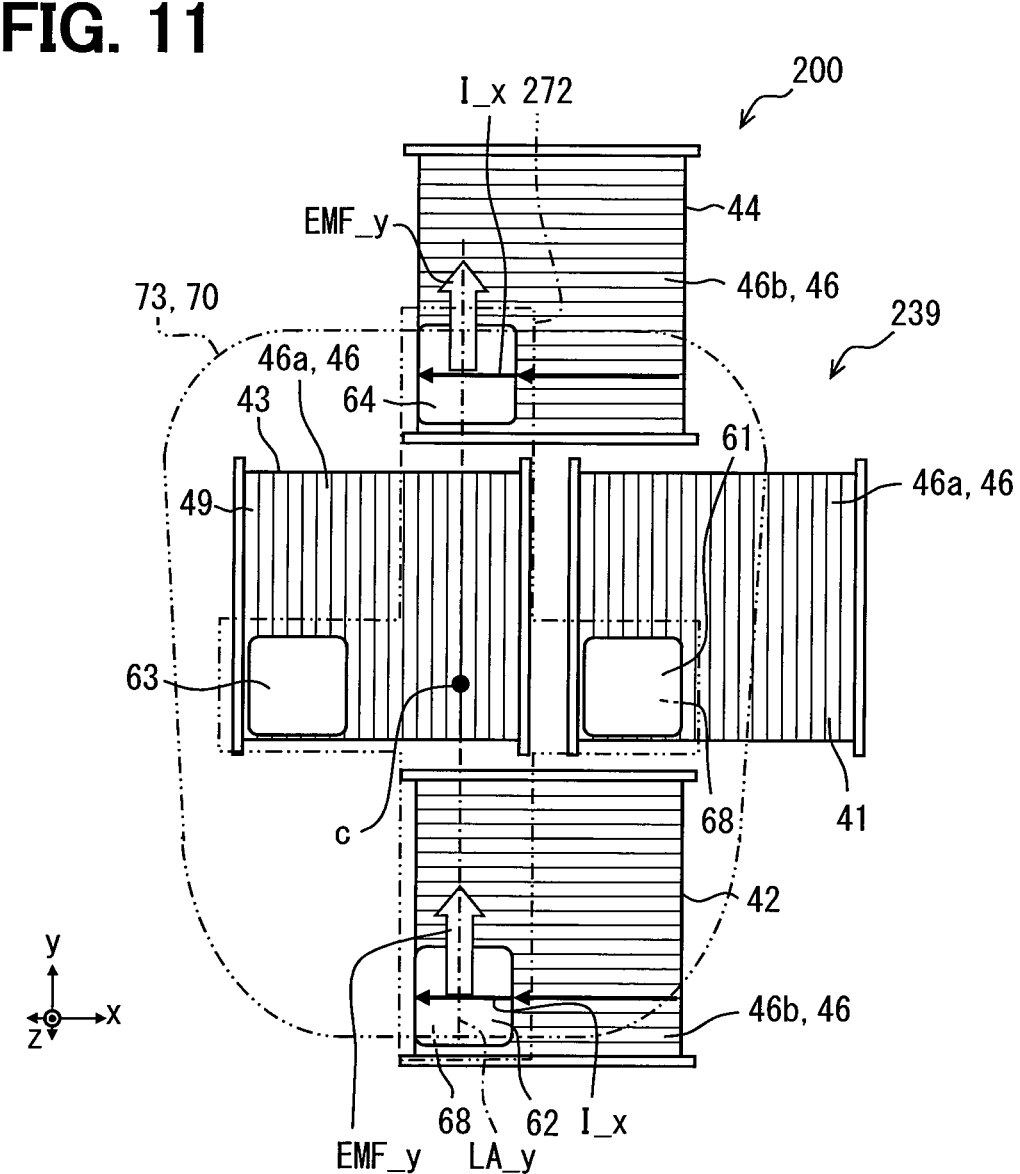
FIG. 11 is a schematic view illustrating that, in the second embodiment, an electromagnetic force can be generated, even with the movable part moved rightward and backward.

The second embodiment in this disclosure shown in FIGS. 10, 11 is a modification of the first embodiment. In a reaction force generating section 239 for an input device 200 according to the second embodiment, four coils 41 to 44 are arranged in the shape of a cross, two in the x-axial direction and another two in the y-axial direction. The two coils 42, 44 arranged in the y-axial direction are located on both sides of the coils 41, 42 so as to sandwich these coils 41, 43 arranged in the x-axial direction. With the arrangement of the coils 41 to 44 described above, the reaction force generating section 239 is configured such that two first coil side-surfaces 46*a* are disposed along the x-axial direction and two second coil side-surfaces 46*b* are disposed in the y-axial direction.

Similarly to the coils 41 to 44, magnets 61 to 64 are arranged in the shape of a cross. With an operation knob 73 having returned to a reference position, the magnets 61 to 64 are located in the respective centers of the corresponding coils 41 to 44. The two magnets 61, 63 for generating an electromagnetic force EMF_x in the x-axial direction are arranged parallel with each other along the x-axis and in the same position in the y-axial direction. The two magnets 62, 64 for generating an electromagnetic force EMF_y in the y-axial direction are arranged parallel with each other along the y-axis and in the same position in the x-axial direction. The opposing faces 68 (refer to FIG. 3) of the magnets 61, 63 are identical in magnetic polarity. On the other hand, the opposing faces 68 of the magnets 62, 64 and the opposing faces 68 of the magnets 61, 63 differ in magnetic polarity.

The fixed yokes 251 have the form of a quadrangular prism, and are independently accommodated in the respective accommodation chambers 48 of the coils 41 to 44. The movable yoke 272 is formed in the shape of a cross corresponding to the arrangement of the magnets 61 to 64 described above. The movable yoke 272 holds the magnets 61, 63 at the leading ends of a portion extending in a belt shape in the x-axial direction, and holds the magnets 62, 64 at the leading ends of a portion extending in a belt shape in the y-axial direction.

An operation reaction force generated by the reaction force generating section 239 will be described in detail below.

As shown in FIG. 10, current I_y flows in the wires 49 of the two coils 41, 43, thereby generating an electromagnetic force EMF_x in the x-axial direction. A resultant force of these electromagnetic forces EMF_x serves as an operation reaction force in the x-axial direction. With the arrangement of the magnets 61 to 64 in the shape of a cross, the acting line LA_x of the electromagnetic force EMF_x acting on the two magnets 61, 63 passes through the center c of the four magnets 61 to 64.

As shown in FIG. 11, current I_x flows in the wires 49 of the two coils 42, 44, thereby generating an electromagnetic force EMF_y in the y-axial direction. A resultant force of these electromagnetic forces EMF_y serves as an operation reaction force in the y-axial direction. Additionally, the acting line LA_y of the electromagnetic force EMF_y acting on the two magnets 62, 64 passes through the center c of the four magnets 61 to 64.

Accordingly, the reaction force generating section 239 can generate an operation reaction force in any direction along the operation plane OP (refer to FIG. 3) by combining these electromagnetic forces EMF_x and EMF_y. Additionally, even with an operation knob 73 having returned to the reference position (refer to FIG. 10), or with the operation knob 73 having moved backward or rightward (refer to FIG. 11), the state in which the opposing faces 68 are counter to the respective coil side-surfaces 46 can be maintained. Therefore, regardless of the stroked position of the operation knob 73, the reaction force generating section 239 can generate an operation reaction force in each direction along the operation plane OP.

Similarly to the first embodiment, also in the second embodiment that has just been described above, the magnitude of the electromagnetic forces EMF_x, EMF_y that can be generated can be ensured while the opposing face 68 is formed in an area smaller than the corresponding coil side-surface 46. Accordingly, in addition to a reduction in the size of each of the magnets 61 to 64, the magnitude of an operation reaction force that can be generated by the input device 200 can be ensured.

Additionally, with the cross arrangement of the coils 41 to 44 and the cross arrangement of the magnets 61 to 64 in the second embodiment, the electromagnetic forces EMF_x, EMF_y in the axial directions are less likely to cause moment around the center c of the four magnets 61 to 64. Therefore, moment around the z-axis in which the movable part 70 is rotated can be reduced.

In the second embodiment, the fixed yoke 251 corresponds to a magnetic yoke part, and the movable yoke 272 corresponds to a movable body.

(Third Embodiment)

Figure 12:
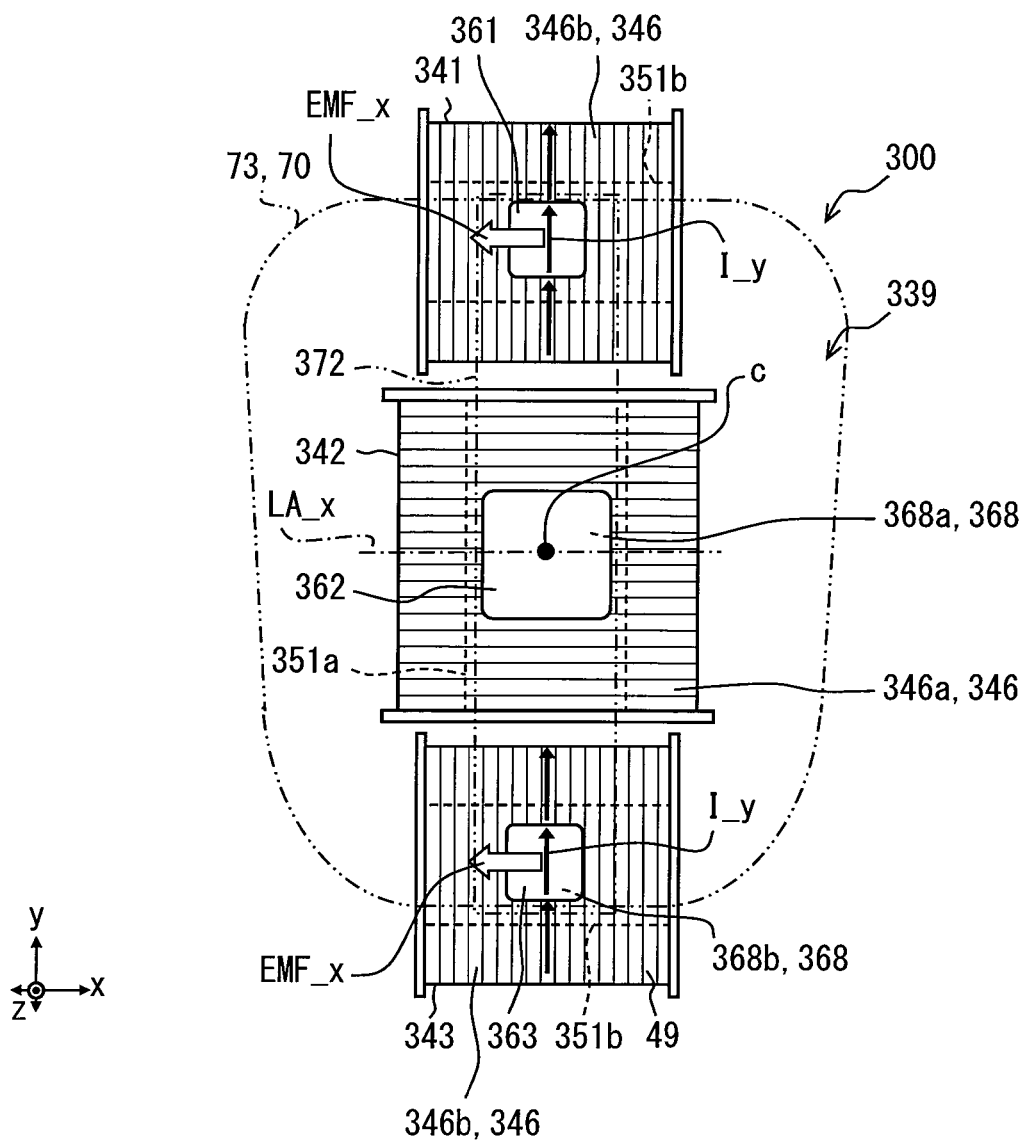
FIG. 12 is a schematic diagram of the configuration of a reaction force generating section according to a third embodiment, and illustrates the principle by which this reaction force generating section generates an electromagnetic force in the x-axial direction.
Figure 13:
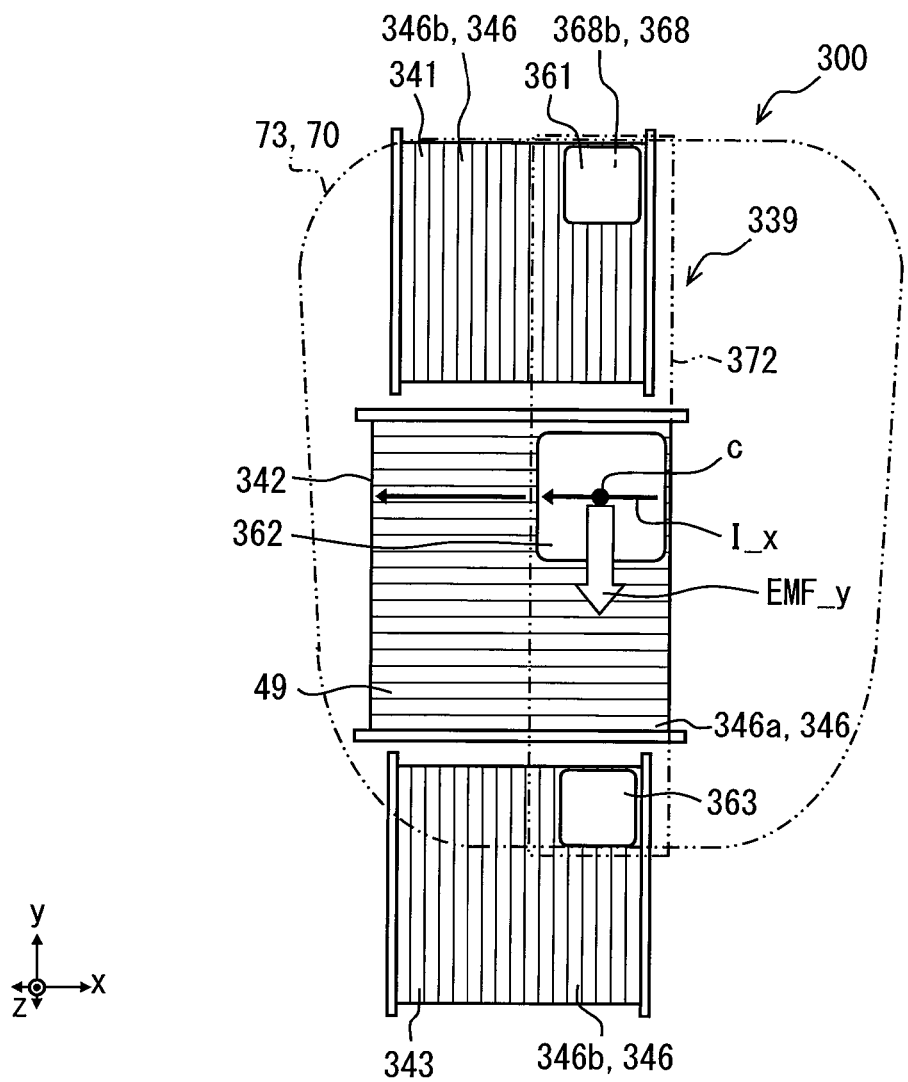
FIG. 13 is a schematic view illustrating that, in the third embodiment, an electromagnetic force can be generated, even with the movable part moved rightward and backward.

The third embodiment in this disclosure shown in FIGS. 12, 13 is a modification of the second embodiment. In an input device 300 according to the third embodiment, a reaction force generating section 339 is composed of three coils 341 to 343, three magnets 361 to 363, fixed yokes 351a, 351b, a movable yoke 372, and so on.

The three coils 341 to 343 are arrayed in the y-axial direction. Among the three coils 341 to 343, the one located in the middle is called a middle coil 342, and the other two located on both sides of the middle coil 342 in the y-axial direction are called side coils 341, 343. The middle coil 342 and side coils 341, 343 each are provided with a coil side-surface 346. In the third embodiment, a wire 49 forming a coil side-surface 346 (hereinafter, referred to as a first coil side-surface 346a) of the middle coil 342 extends in the x-axial direction. A wire 49 forming the coil side-surface 346 (hereinafter, second coil side-surface 346b) of each of the side coils 341, 343 differs from the wire 49 forming the first coil side-surface 346a, and extends in the y-axial direction. The middle coil 342 is formed larger in size than the side coils 341, 343. Thus, among the three coil side-surfaces 346 formed into an approximately quadrangular shape, the length of one side of the first coil side-surface 346a is prescribed so as to be longer than the length of one side of each second coil side-surface 346b.

Similarly to the coils 341 to 343, the three magnets 361 to 363 are arrayed in the y-axial direction. With the operation knob 73 having returned to the reference position, the magnets 361 to 363 are located in the respective centers of the coils 341 to 343. Among the three magnets 361 to 363, the one maintaining the state in which this magnet is opposed to the middle coil 342 is referred to as the middle magnet 362, and the other ones maintaining the states in which these magnets are counter to the respective side coils, 341, 343, are referred to as side magnets 361, 363. The middle magnet 362 is formed larger in size than the side magnets 361, 363. The middle magnet 362 generates an electromagnetic force EMF_y in the y-axial direction between the magnet 362 and the middle coil 342. The side magnets 361, 363 are arranged in parallel with each other in the x-axial direction and generate an electromagnetic force EMF_x in the x-axial direction between the side coils 341, 343 and side magnets 361, 363, respectively. The magnetic polarities of the side magnets 361, 363 counter to the respective faces 368b are the same, and different from the magnetic polarity of the middle magnet 362 counter to the face 368a.

Similarly to the fixed yoke 251 (refer to FIG. 10) of the second embodiment, each of the fixed yokes 351a, 351b has a quadrangular prism shape. The fixed yoke 351a accommodated in the middle coil 342 is formed larger in size than the fixed yoke 351b accommodated in each of the side coils 341, 343.

The movable yoke 372 is formed into a rectangular shape whose longitudinal direction is the y-axial direction so as to match the arrangement of the magnets 361 to 363 described above. The movable yoke 372 holds the middle magnet 362 in the middle portion thereof in the y-axial direction and holds the side magnets 361, 363 at both end portions thereof in the y-axial direction.

An operation reaction force generated by the reaction force generating section 339 will be described in detail below.

As shown in FIG. 12, current I_y flows in the wires 49 of the two side coils 341, 343, thereby generating an electromagnetic force EMF_x in the x-axial direction. A resultant force of these electromagnetic forces EMF_x serves as an operation reaction force in the x-axial direction. Additionally, by exerting control such that electromagnetic forces EMF_x acting on the side magnets 361, 363 are almost equal, the acting line LA_x of the resultant force of these electromagnetic forces EMF_x passes through or near the center c of the three magnets 361 to 363.

As shown in FIG. 13, current I_x flows in the wire 49 of the middle coil 342, thereby generating an electromagnetic force EMF_y in the y-axial direction. The middle magnet 362 is located in the middle of the three magnets 361 to 363 and, therefore, the electromagnetic force EMF_x acting on the middle coil 342 acts on the center c of the three magnets 361 to 363.

Accordingly, the reaction force generating section 339 can generate an operation reaction force in any direction along the operation plane OP (refer to FIG. 3) by combining these electromagnetic forces EMF_x and EMF_y. Additionally, even with the operation knob 73 having returned to the reference position (refer to FIG. 12), or with the operation knob 73 having moved backward or rightward (refer to FIG. 13), the state in which the opposing faces 368a, 368b are counter to the respective coil side-surfaces 346 can be maintained. Therefore, regardless of the stroked position of the operation knob 73, the reaction force generating section 339 can generate an operation reaction force in each direction along the operation plane OP.

Similarly to the second embodiment, also in the third embodiment that has just been described above, the magnitude of the electromagnetic forces EMF_x, EMF_y that can be generated, can be ensured while the opposing faces 368a, 368b are formed in areas smaller than the coil side-surfaces 346. Accordingly, in addition to a reduction in the size of each of the magnets 361 to 363, the magnitude of an operation reaction force that can be generated by the input device 300, can be ensured.

In the third embodiment, an operation reaction force in each direction along the operation plane OP (refer to FIG. 3) can be generated by the three magnets 361 to 363. In such a configuration, the amounts of magnets used in the reaction force generating section 339 can be further reduced.

Furthermore, in the third embodiment, the coils 341 to 343 are arranged in a straight line and the magnets 361 to 363 are also arranged in a straight line. With such an arrangement, the resultant force of an electromagnetic force EMF_x acting on the middle magnet 362 and electromagnetic forces EMF_y acting on the side magnets 361, 363 is made less likely to produce such a moment around the z-axis around which the movable part 70 rotates.

In the third embodiment, the coils 341 to 343 correspond to coil bodies, the middle coil 342 corresponds to a middle coil body and the fixed yokes 351a, 351b correspond to magnetic yoke parts. Additionally, the magnets 361 to 363 correspond to magnetic-pole formation sections and the movable yoke 372 corresponds to a mobile body.

(Fourth Embodiment)

Figure 14:
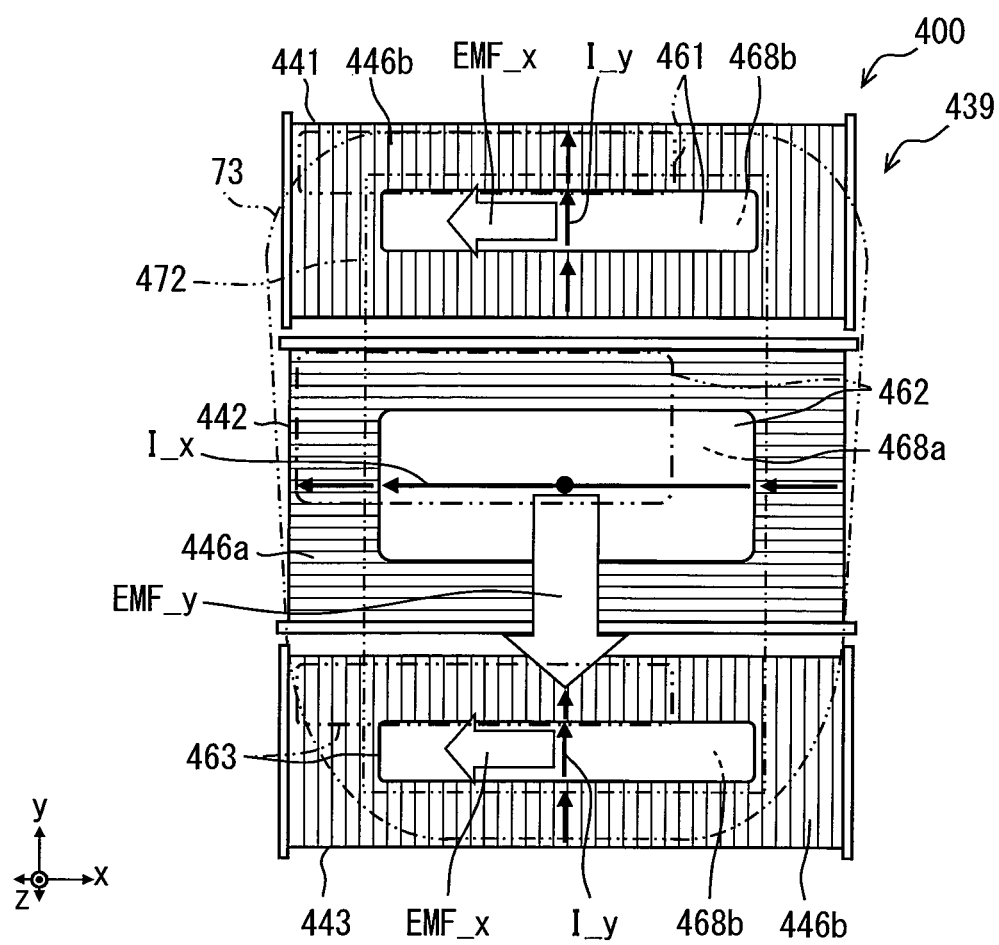
FIG. 14 is a schematic diagram of a reaction force generating section for an input device according to a fourth embodiment.

An input device 400 according to the fourth embodiment in this disclosure shown in FIG. 14 is a modification of the third embodiment. In a reaction force generating section 439 according to the fourth embodiment, a first coil side-surface 446a of a middle coil 442 and second coil side-surfaces 446b of side coils 441, 443 each have a rectangular shape such that the dimension of each of the coils 441 to 443 in the y-axial direction in which the coils 441 to 443 are arrayed is smaller than the dimension of each of the coils 441 to 443 in the x-axial direction. The dimension of the first coil side-surface 446a in the x-axial direction and the dimension of each second coil side-surface 446b in the x-axial direction are equal to each other.

Similarly to the coils 441 to 443, three magnets 461 to 463 have a rectangular shape whose longitudinal direction is the x-axial direction. The middle magnet 462 forms an opposing face 468a, which is opposed to the first coil side-surface 446a of the middle coil 442. Side magnets 461, 463 form opposing faces 468b, which are counter to the side coils 441, 443, respectively. The area of the opposing face 468a is substantially equal to the total of the areas of the two opposing faces 468b. The magnets 461 to 463 are mounted on a movable yoke 472 having a rectangular shape whose longitudinal direction is the y-axial direction.

In the reaction force generating section 439, the middle magnet 462 generates an electromagnetic force EMF_y in the y-axial direction between this magnet 462 and the middle coil 442 in which current I_x flows. Additionally, the side magnets 461, 463 generate electromagnetic forces EMF_x in the x-axial direction between these magnets 461, 463 and the side coils 441, 443, respectively, in which current I_y flows. The reaction force generating section 439 can generate an operation reaction force in any direction along the operation plane OP (refer to FIG. 3) by combining these electromagnetic forces EMF_x and EMF_y. Additionally, even with the operation knob 73 having returned to the reference position, or with the operation knob 73 having moved backward or rightward (refer to two-dot chain line in FIG. 14), the reaction force generating section 439 maintains the state in which the opposing faces 468a, 468b are counter to the coil side-surfaces 446a, 446b, respectively. Therefore, regardless of the stroked position of the operation knob 73, the reaction force generating section 439 can generate an operation reaction force in each direction.

Similarly to the third embodiment, also in the fourth embodiment that has just been described above, the magnitude of the electromagnetic forces EMF_x, EMF_y that can be generated, can be ensured while the opposing faces 468a, 468b are formed in areas smaller than the respective coil side-surfaces 446a, 446b. Accordingly, in addition to a reduction in the size of each of the magnets 461 to 463, the magnitude of operation reaction force that can be generated by the input device 400 can be ensured.

Additionally, in the fourth embodiment, the dimension of each of the coil side-surfaces 446a, 446b is made small in the y-axial direction in which the three coils 441 to 443 are arrayed. Accordingly, the three coils 441 to 443 can easily be accommodated in a narrow space. Thus, in addition to the configuration in which the number of coils is reduced, the input device 400 can be made smaller.

In the fourth embodiment, the coils 441 to 443 correspond to coil bodies and the middle coil 442 corresponds to a middle coil body. Additionally, the magnets 461 to 463 correspond to magnetic-pole formation sections and the movable yoke 472 corresponds to a mobile body.

(Fifth Embodiment)

Figure 15:
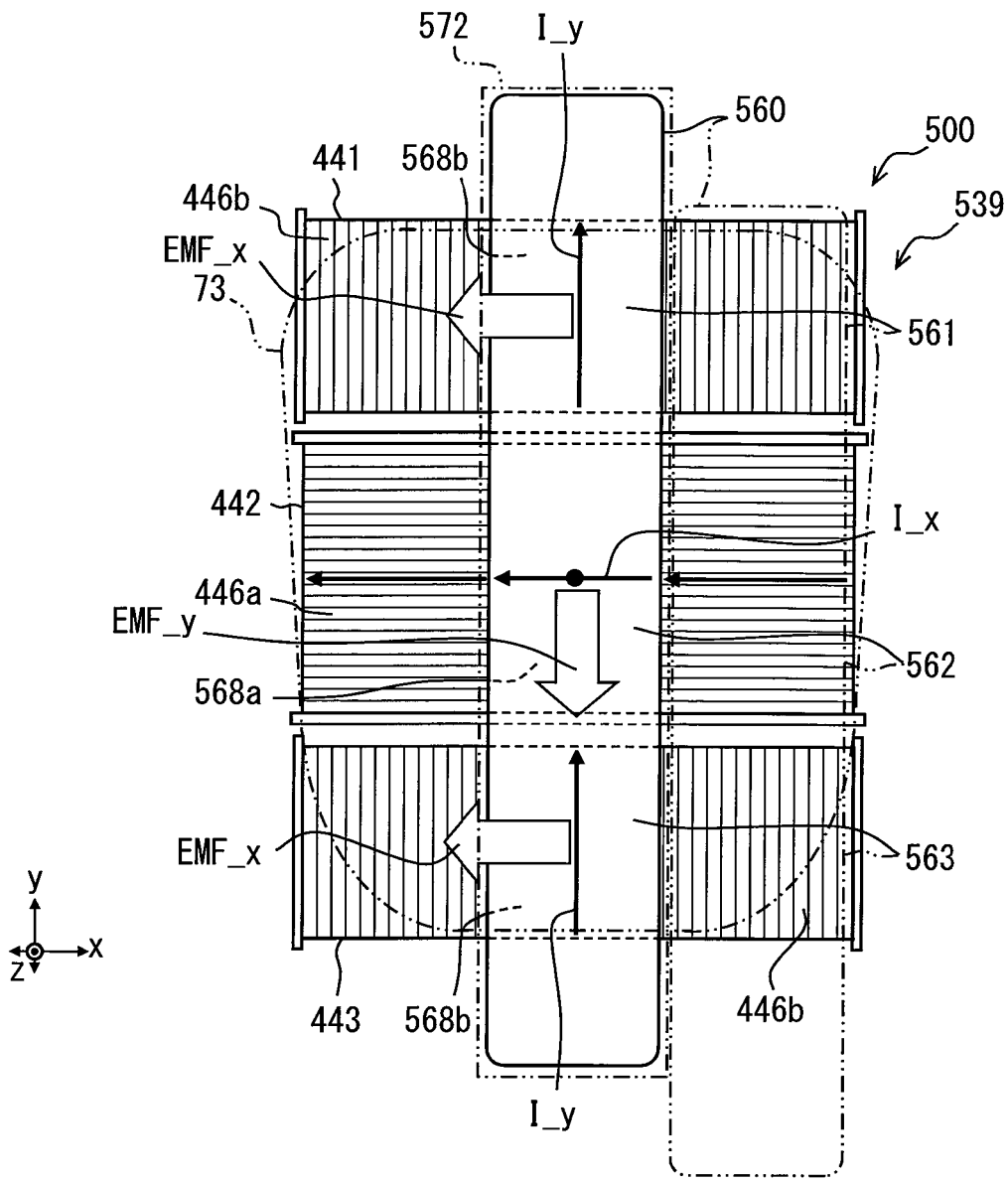
FIG. 15 is a schematic diagram of a reaction force generating section for an input device according to a fifth embodiment.

The fifth embodiment in this disclosure shown in FIG. 15 is a modification of the fourth embodiment. In an input device 500 according to the fifth embodiment, a reaction force generating section 539 has a magnet 560 as a configuration in which the three magnets 461 to 463 (refer to FIG. 14) in the fourth embodiment are integrally formed. The magnet 560 has the form of a rectangular plate extending in a belt form in the y-axial direction. With the operation knob 73 having returned to the reference position, both ends of the magnet 560 in the y-axial direction project from side coils 441, 443. The magnet 560 forms three coils 441 to 443 held by a movable yoke 572, and three magnetic-pole formation sections 561 to 563 in areas overlapping in the z-axial direction. When the magnet 560 moves, the respective areas of the magnetic-pole formation sections 561 to 563 of the magnet 560 change (refer to two-dot chain line in FIG. 15). Each of the magnetic-pole formation sections 561 to 563 forms opposing faces 568a, 568b, which are counter to coil side-surfaces 446a, 446b. The opposing faces 568a, 568b are continuous in the y-axial direction. The magnetic polarities of the opposing faces 568a, 568b are the same as each other.

In the foregoing reaction force generating section 539, the opposing face 568a of the middle magnetic-pole formation section 562, which is opposed to the first coil side-surface 446a of the magnet 560, generates an electromagnetic force EMF_y in the y-axial direction between this face 568a and the middle coil 442 in which current I_x flows. The opposing faces 568b of the magnetic-pole formation sections 561, 563 on both sides, which are counter to the respective second coil side-surfaces 446b of the magnet 560, generate electromagnetic forces EMF_x in the x-axial direction between these opposing faces 568b and the side coils 441, 443 in which current I_y flows. Even when the magnet 560 has moved from the reference position, the reaction force generating section 539 can provide the opposing faces 568a, 568b, which are counter to the coil side-surfaces 446a, 446b, respectively. Therefore, regardless of the stroked position of the operation knob 73, the reaction force generating section 539 can generate an operation reaction force in each direction along the operation plane OP (refer to FIG. 3).

Also in the fifth embodiment that has just been described above, the magnitude of the electromagnetic forces EMF_x, EMF_y that can be generated can be ensured while the opposing faces 568a, 568b are formed in areas smaller than the coil side-surfaces 446a, 446b. Accordingly, in addition to a reduction in the size of the magnet 560, the magnitude of an operation reaction force that can be generated by the input device 500 can be ensured.

Additionally, where coils bodies are arranged in a straight line in the y-axial direction as in the fifth embodiment, the opposing faces 568a, 568b can be rendered continuous by employing the magnet 560 integrated in a belt form. In the configuration, for example, the configuration of the magnet 560 and the configuration of the movable yoke 572 holding the magnet 560 can be simplified. In the fifth embodiment, the movable yoke 572 corresponds to a mobile body.

(Sixth Embodiment)

Figure 16:
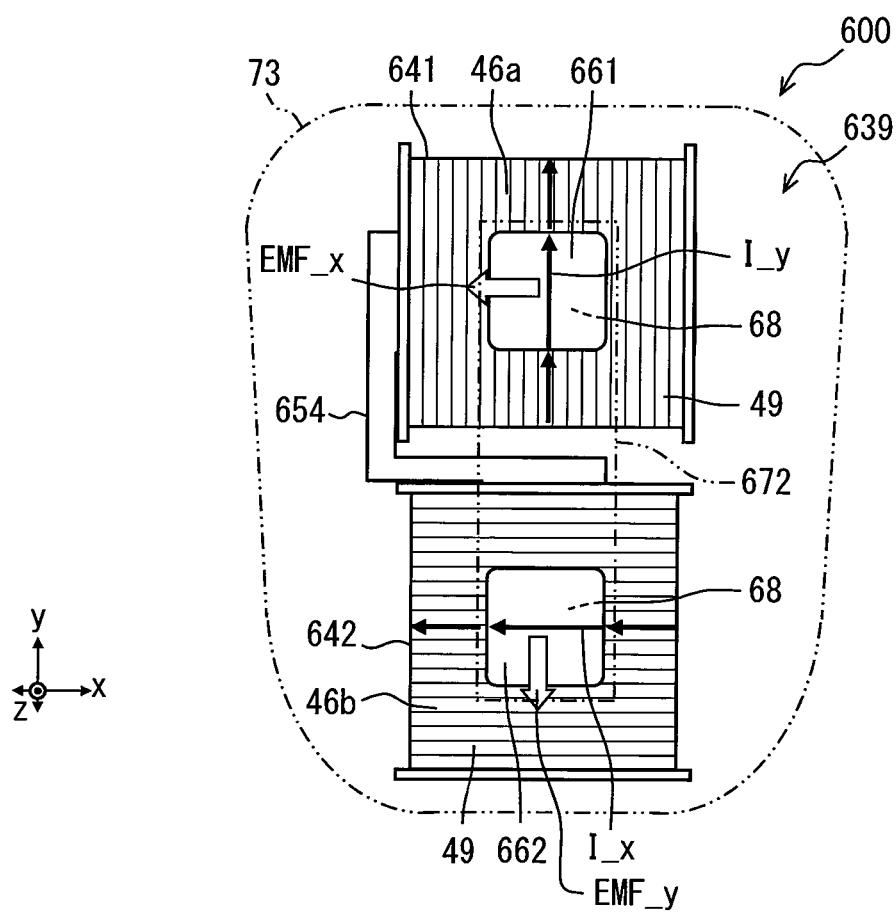
FIG. 16 is a schematic diagram of a reaction force generating section for an input device according to a sixth embodiment.

The sixth embodiment in this disclosure shown in FIG. 16 is a modification of the first embodiment. In an input device 600 according to the sixth embodiment, a reaction force generating section 639 is composed of two coils 641, 642, a fixed yoke 654, two magnets 661, 662, a movable yoke 672, and so on.

The two coils 641, 642 have configuration substantially identical to the coils 41, 44 (refer to FIG. 4) in the first embodiment, and are arrayed in the y-axial direction. The direction of the winding axis of the coil 641 is oriented in the x-axial direction. The coil 641 forms a first coil side-surface 46a in which wire 49 extends in the y-axial direction. The direction of the winding axis of the coil 642 is oriented in the y-axial direction. The coil 642 forms a second coil side-surface 46b in which wire 49 extends in the x-axial direction. The two coils 641, 642 are connected by the fixed yoke 654. The fixed yoke 654 has a configuration substantially identical to the fixed yoke 54 (refer to FIG. 4) in the first embodiment.

The two magnets 661, 662 have configuration substantially identical to the magnets 61, 64 (refer to FIG. 4) in the first embodiment, and are arrayed in the y-axial direction, as with the coils 641, 642. The two magnets 661, 662 are held by the movable yoke 672. The magnet 661 has a opposing face 68, which is opposed to a first coil side-surface 46a, and generates an electromagnetic force EMF_x in the x-axial direction between this opposing face 68 and the coil 641 in which current I_y flows. The magnet 662 has a opposing face 68, which is opposed to a second coil side-surface 46b, and generates an electromagnetic force EMF_y in the y-axial direction between this opposing face 68 and the coil 642 in which current I_x flows.

Even when the operation knob 73 has moved from the reference position, the reaction force generating section 639 can maintain a state in which the coil side-surfaces 46a, 46b are counter to the respective opposing faces 68. Therefore, regardless of the stroked position of the operation knob 73, the reaction force generating section 639 can generate an operation reaction force in any direction along the operation plane OP (refer to FIG. 3).

Similarly to the first embodiment, also in the sixth embodiment that has just been described above, the magnitude of the electromagnetic forces EMF_x, EMF_y that can be generated can be ensured while the opposing faces 68 are formed in areas smaller than the coil side-surfaces 46a, 46b. Accordingly, in addition to a reduction in the size of each of the magnets 661, 662, the magnitude of an operation reaction force that can be generated by the input device 600 can be ensured.

In the sixth embodiment, an operation reaction force in each direction along the operation plane OP (refer to FIG. 3) can be generated by the two magnets 661, 662. In such a configuration, the amounts of magnets used in the reaction force generating section 639 can be further reduced.

In the sixth embodiment, the coils 641, 642 correspond to coil bodies, the magnets 661, 662 correspond to magnetic-pole formation section, and the movable yoke 672 corresponds to a mobile body.

(Seventh Embodiment)

Figure 17:
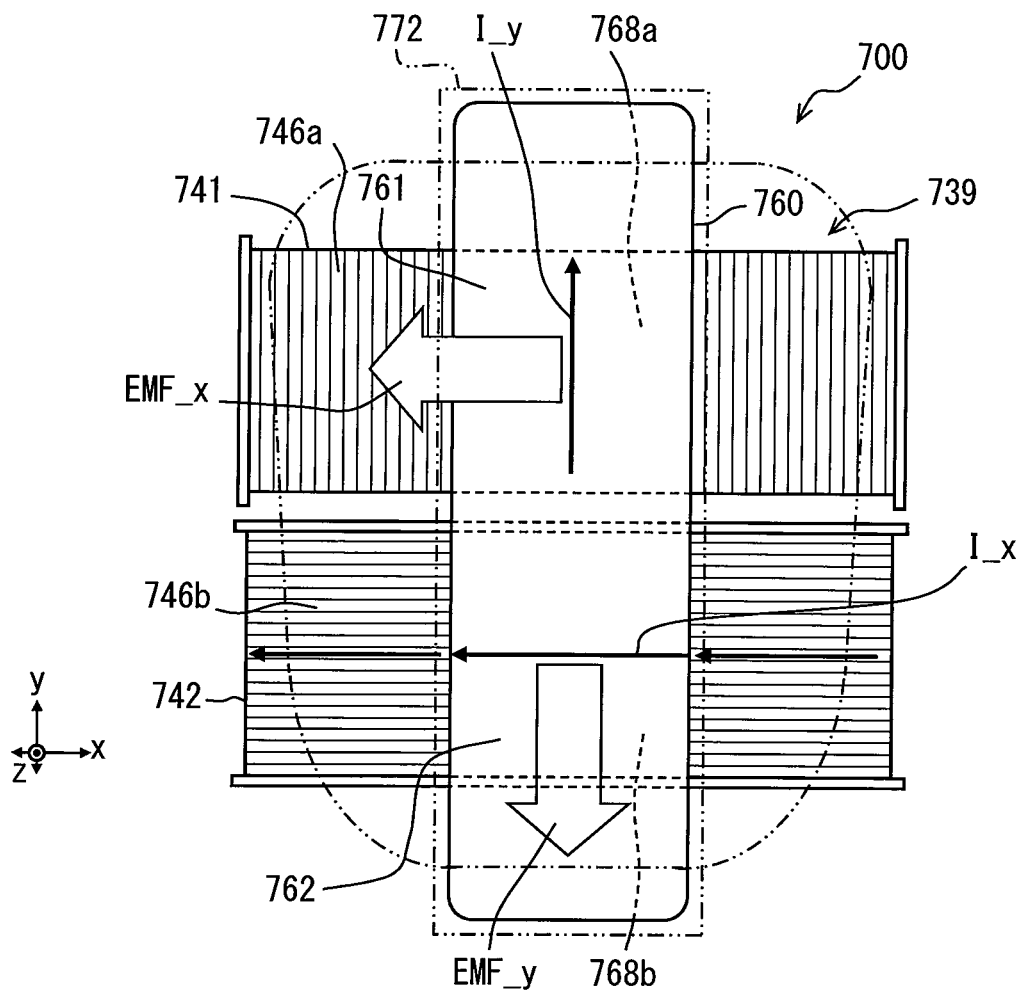
FIG. 17 is a schematic diagram of a reaction force generating section for an input device according to a seventh embodiment.

The seventh embodiment in this disclosure shown in FIG. 17 is a modification of the sixth embodiment. In a reaction force generating section 739 for an input device 700 according to the seventh embodiment, the first coil side-surface 746a of a coil 741 and the second coil side-surface 746b of a coil 742 are formed into a rectangular shape such that the dimensions of the first and second coil side-surfaces 746a, 746b are smaller in the y-axial direction than those in the x-axial direction. Additionally, as a configuration in which the two magnets 661, 662 (refer to FIG. 16) in the sixth embodiment are integrally formed, the reaction force generating section 739 has a magnet 760. The magnet 760 corresponds to the magnet 560 in the fifth embodiment (refer to FIG. 15) in the configuration, and has a rectangular shape extending in a belt form in the y-axial direction. The magnet 760 forms two coils 741, 742 held by a movable yoke 772, and two magnetic-pole formation sections 761, 762 in areas overlapping in the z-axial direction. The magnetic-pole formation section 761 forms a opposing face 768a, which is opposed to the first coil side-surface 746a. The magnetic-pole formation section 762 forms a opposing face 768b, which is opposed to the second coil side-surface 746b. The opposing faces 768a, 768b are continuous in the y-axial direction. Even when the magnet 760 has moved from the reference position, the opposing faces 768a, 768b, which are counter to the coil side-surfaces 746a, 746b, are continuously formed.

In the foregoing reaction force generating section 739, current I_y flows in the coil 741 and, therefore, an electromagnetic force EMF_x in the x-axial direction acts on the opposing face 768a, which is opposed to the first coil side-surface 746a. On the other hand, current I_x flows in the coil 742 and, therefore, an electromagnetic force EMF_y in the y-axial direction acts on the opposing face 768b, which is opposed to the second coil side-surface 746b. The reaction force generating section 739 can generate an operation reaction force in any direction along the operation plane OP (refer to FIG. 3) by combining these electromagnetic forces EMF_x and EMF_y.

Also the seventh embodiment that has just been described above, the magnitude of the electromagnetic forces EMF_x, EMF_y that can be generated can be ensured while the opposing faces 768a, 768b are formed in areas smaller than the coil side-surfaces 746a, 746b. Accordingly, in addition to a reduction in the size of the magnet 760, the magnitude of an operation reaction force that can be generated by the input device 700 can be ensured.

In the seventh embodiment, the coils 741, 742 correspond to coil bodies, and the movable yoke 772 corresponds to a mobile body.

(Eighth Embodiment)

Figure 18:
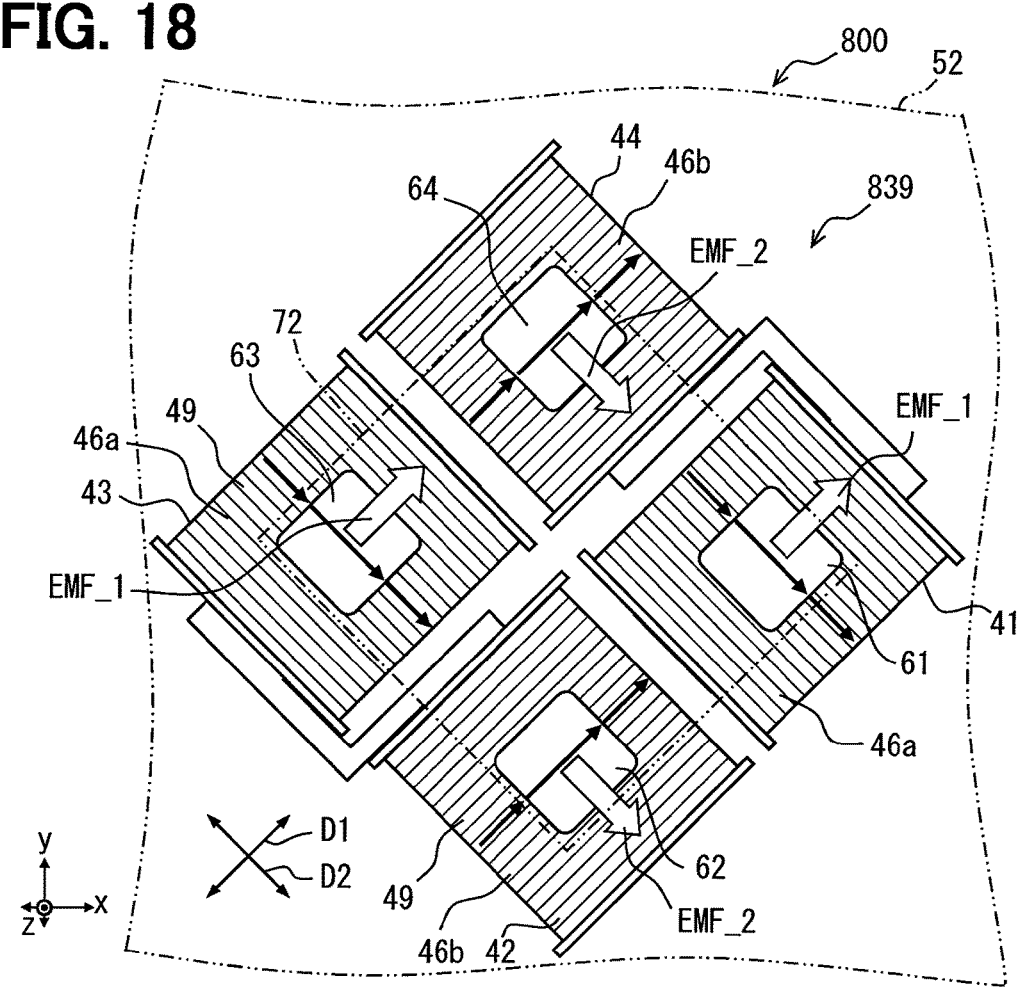
FIG. 18 is a schematic diagram of a reaction force generating section for an input device according to an eighth embodiment.

The eighth embodiment in this disclosure shown in FIG. 18 is a modification of the first embodiment. In an input device 800 according to the eighth embodiment, the direction of the winding axis for each of coils 41 to 44 provided in the reaction force generating section 839 is inclined with respect to the x-axis and y-axis. In a description below, a direction shifted by 45° around the z-axis from the x-axis to the y-axis is referred to a first direction D1 and a direction shifted by 45° around the z-axis from the y-axis to the x-axis is referred to a second direction D2.

In the coils 41 to 44, coil side-surfaces 46a, 46b having an approximately quadrangular shape are mounted on a circuit board 52 such that the coil side-surfaces 46a, 46b are positioned along the first direction D1 or the second direction D2. The wire 49 of the first coil side-surface 46a formed on each of the coils 41, 43 extends in the second direction D2. The wire 49 of the second coil side-surface 46b formed on each of the coils 42, 44 extends in the first direction D1. Additionally, in the eighth embodiment, similarly to the coils 41 to 44, the magnets 61 to 64 are also mounted on a movable yoke 72 such that the magnets 61 to 64 are positioned along the first direction D1 or second direction D2.

In the reaction force generating section 839, current flows in the coils 41, 43 and, therefore, an electromagnetic force EMF_1 in the first direction D1 acts on each of the magnets 61, 63. On the other hand, current flows in the coils 42, 44 and, therefore, an electromagnetic force EMF_2 in the second direction D2 acts on each of the magnets 62, 64. The reaction force generating section 839 can generate an operation reaction force in any direction along the operation plane OP (refer to FIG. 3) by combining these electromagnetic forces EMF_1 and EMF_2.

Similarly to the first embodiment, also in the eighth embodiment that has just been described above, in addition to a reduction in the size of each of the magnets 61 to 64, the magnitude of an operation reaction force that can be generated by the input device 800 can be ensured. As long as the wires 49 forming the respective coil side-surfaces 46a, 46b are different from each other in the extending direction, these extending directions do not have to be along the x-axis and y-axis.

(Ninth Embodiment)

Figure 19:
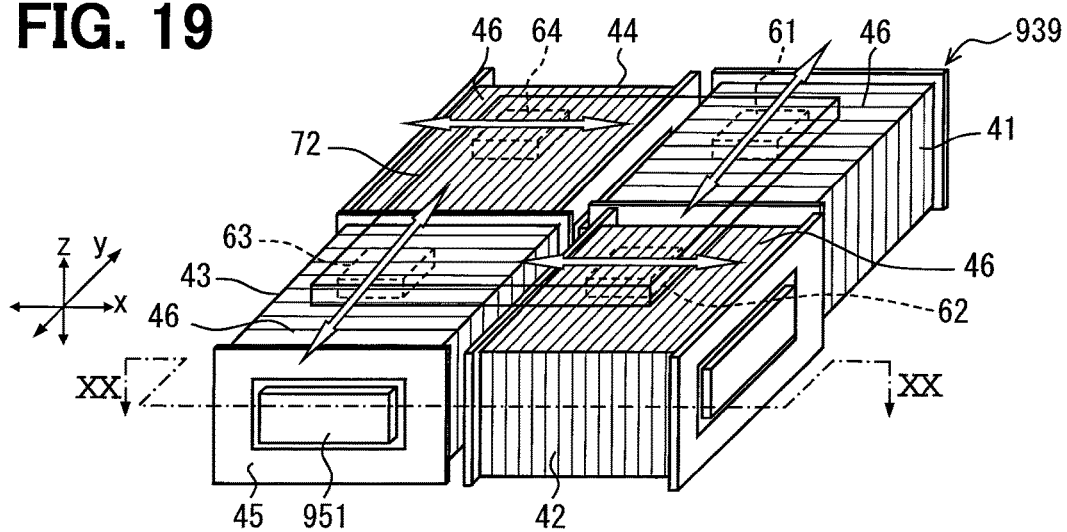
FIG. 19 is a schematic diagram of a reaction force generating section for an input device according to a ninth embodiment.
Figure 20:
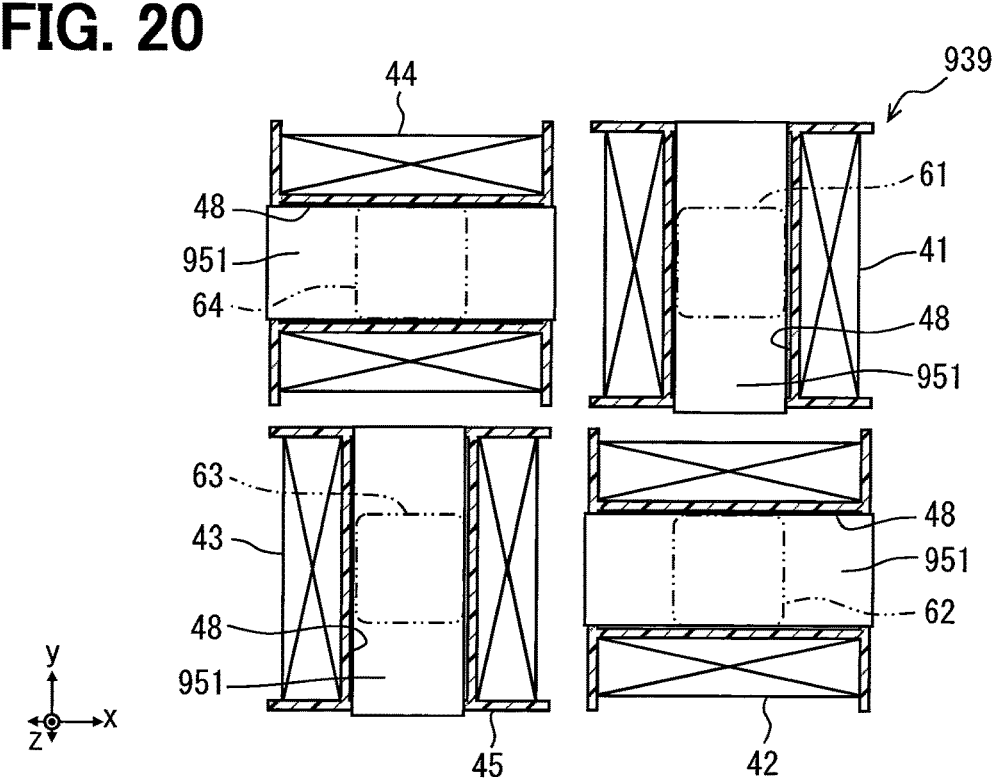
FIG. 20 is a diagram illustrating the shape of each fixed yoke according to the ninth embodiment.

The ninth embodiment in this disclosure shown in FIGS. 19, 20 is a further modification of the first embodiment. Fixed yokes 951 provided in a reaction force generating section 939 in the ninth embodiment are independently accommodated in respective accommodation chambers 48 of coils 41 to 44. Each of the fixed yokes 951 has a quadrangular prism shape and is inserted into a bobbin 45 such that the direction of its axis is positioned along the direction of a winding axis.

As with the ninth embodiment described above, even where the fixed yokes 951 are separately provided for the coils, the fixed yokes 951 form a magnetic circuit together with the movable yoke 72 and can exhibit the function of collecting magnetic fluxes of the magnets 61 to 64 on the coil side-surfaces 46. Accordingly, electromagnetic forces EMF_x, EMF_y in the respective directions of the axes can act on the magnets 61 to 64 securely. As described above, in addition to a reduction in the size of each of the magnets 61 to 64, the magnitude of an operation reaction force that can be generated by the reaction force generating section 939, can be ensured. In the ninth embodiment, the fixed yoke 951 corresponds to a magnetic yoke part.

(Other Embodiments)

The embodiments according to this disclosure have been described. However, it should be understood that the disclosure is not limited to the foregoing embodiments but can be applied in various embodiments or in combination.

Figure 21:
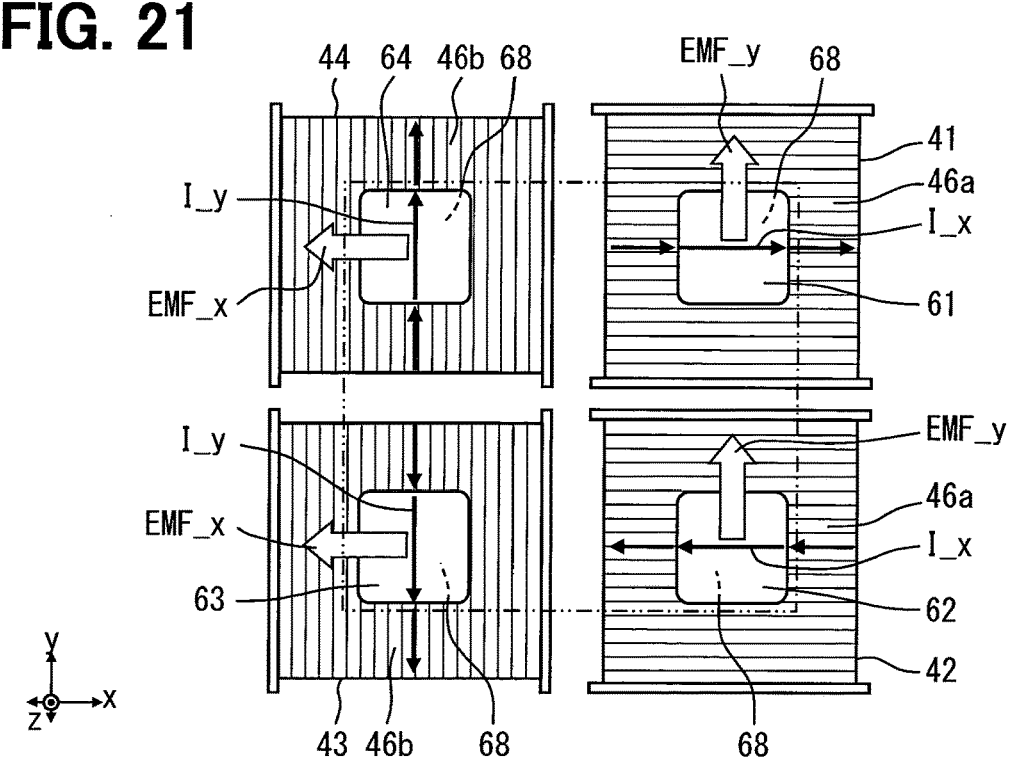
FIG. 21 is schematic diagram of the configuration of a reaction force generating section according to a modification 1.
Figure 22:
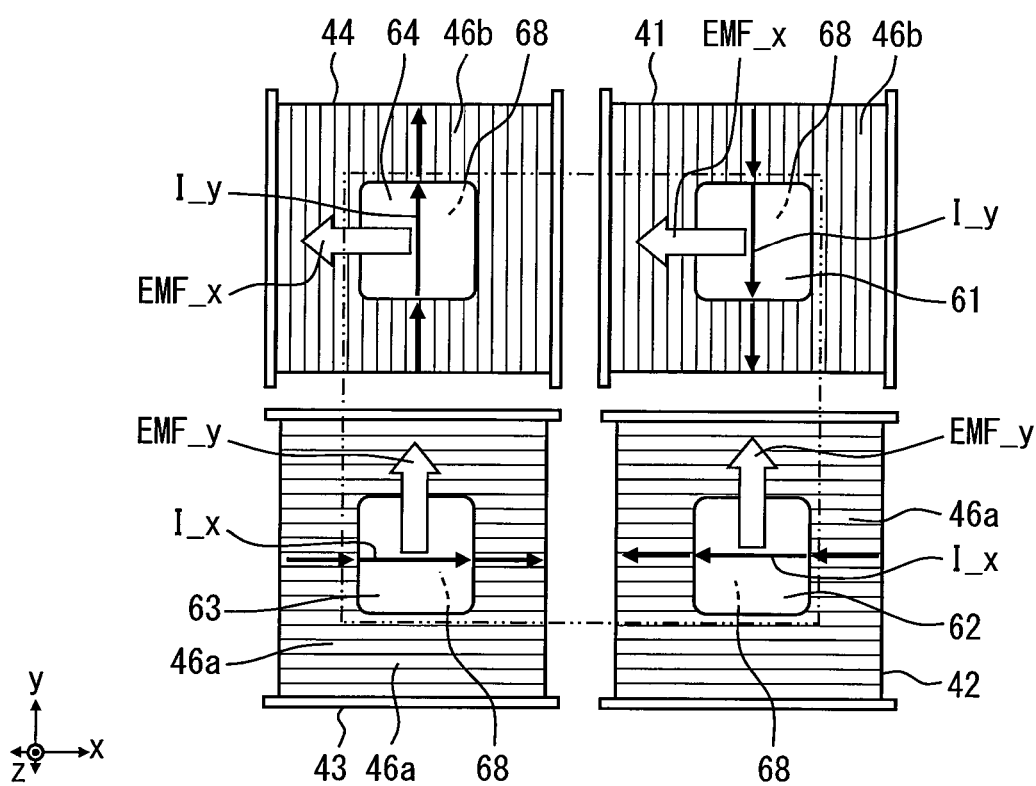
FIG. 22 is schematic diagram of the configuration of a reaction force generating section according to a modification 2.

In the first embodiment, the four coils 41 to 44 are arranged such that the first coil side-surface 46a and the second coil side-surface 46b are arranged in a zigzag manner. However, as shown in a modification 1 shown in FIG. 21, the two first coil side-faces 46a and the two second coil side-faces 46b do not have to alternate one another but may be arrayed in the y-axial direction. Alternatively, as shown in a modification 2 shown in FIG. 22, the two first coil side-faces 46a and the two second coil side-faces 46b may be arrayed in the x-axial direction.

In the first embodiment, the magnetic polarities of the two opposing faces 68, which are counter to the respective first coil side-faces 46a, are made identical. Similarly, the magnetic polarities of the two opposing faces 68, which are counter to the respective second coil side-faces 46b, are made identical. However, as shown in the modifications 1, 2 shown in FIGS. 21, 22, the magnetic polarities of the two opposing faces 68, which are counter to the respective first coil side-surfaces 46a, may be different from each other. Similarly, the magnetic polarities of the two opposing faces 68, which are counter to the respective second coil side-faces 46b, may also be different from each other. By causing currents I_x in reverse directions to flow in the first coil side-surfaces 46a, electromagnetic forces EMF_y in the same direction act on the magnets 61, 62 in the modification 1, and the magnets 62, 63 in the modification 2. By causing currents I_y in reverse directions to flow in the second coil side-surfaces 46b, electromagnetic forces EMF_x in the same direction act on the magnets 63, 64 in the modification 1 and the magnets 61, 64 in the modification 2.

As described above, the magnetic polarity of the opposing face of each magnet can be altered as required. For, example, all the opposing faces may have the identical magnetic polarity. Furthermore, the shape of each magnet is not limited to a rectangular but can be altered as required. For example, each magnet may be formed in a disk shape.

In the first embodiment, each magnet corresponds to one magnetic-pole formation section. Additionally, as shown in the fifth embodiment, one magnet may have the function of a plurality of magnetic-pole formation sections. Furthermore, by combining a plurality of magnets, a configuration corresponding to one magnetic-pole formation section may be formed.

In the foregoing embodiments, the direction of the extension of wire forming the first coil side-surface and the direction of extension of wire forming the second coil side-surface are prescribed to be orthogonal to each other. The directions of extension of wires of the coil side-surface do not have to be orthogonal to each other. The directions of extension of the wires are not limited to the two directions as described above. For example, in three coil side-surfaces, the directions of extension of wires may be different one from another.

In the foregoing embodiments, descriptions have been given using configurations having two to four coils. However, the number of coils may be five or more and can be altered as required. Additionally, the arrangement of coils may be altered as required. Furthermore, the size and shape of a coil side-surface formed on each coil can be altered as required depending on electromagnetic force, an amount of stroke, or the like.

In the third to fifth embodiments, the first coil side-surface of the middle coil is the coil side-surface in which wire extends in the direction of the x axis. However, the first coil side-surface may be a coil side-surface in which wire extends in the direction of the y axis. In such a configuration, the second coil side-surface of each side coil is a coil side-surface in which wire extends in the direction of the x-axis.

In the first embodiment, the coil-side yoke parts accommodated in two coils adjacent to each other are connected by the connection part. However, the number of coil-side yoke parts connected is not limited to two. For example, the configuration in which three or more coil-side yoke parts are connected may form one magnetic circuit. Such a configuration can further improve the density of a magnetic flux passing through each coil side-surface. Furthermore, the configuration of a fixed yoke or the like forming a magnetic yoke part, such as a coil-side yoke part, can be omitted.

In the foregoing embodiments, the functions provided by the operation controller 33 and the reaction-force control section 37 may be provided by hardware and software different from the foregoing or a combination thereof. For example, the function may be provided by a circuit that performs a predetermined function without relying on a program. Furthermore, configurations for controlling operation reaction force of a reaction force control section and an operation control part, can be provided on an external part of each input device.

In the foregoing embodiments, the input device is mounted in the vehicle such that the direction of the operation plane OP (refer to FIG. 3) regulated by the operation knob is positioned along the horizontal direction of the vehicle. However, the input device may be mounted on the center console, or the like, of the vehicle such that the operation plane OP is inclined respect to a horizontal direction of the vehicle.

In the foregoing embodiments, each coil is held by the circuit board. However, a configuration for holding each coil is not limited to the circuit board. However, a housing or the like may directly hold each coil. Additionally, configurations for holding magnets are not limited to the movable yokes as described in the foregoing embodiments but may be altered as required.

As a modification 3 in the first embodiment described above, the display system 10 can have a head-up display device 120, which is another display unit in the vehicle cabin, instead of or together with the navigation device 20. The head-up display device 120 is accommodated in the instrument panel of the vehicle and in front of the driving seat and can network-communicate with the input device 100 through the communication bus 90 or a dedicated communication line. The head-up display device 120 projects an image toward a projection area 122 specified in a window shield, thereby displaying a virtual image of the image. An operator seated on a driving seat can view, through the projection area 122, a plurality of icons with which predetermined functions are associated, the pointer 80 for selecting an arbitrary icon, and so on. As with a case where the pointer 80 is displayed on the display screen 22, when an operation force in a horizontal direction is input on the operation knob 73, the pointer 80 can move within the projection area 122 in a direction corresponding to the input direction of an operation force.

In the foregoing embodiments, descriptions have been given using example in which this disclosure is applied in an input device installed on the center console as a remote operation device for operating the navigation device. However, this disclosure can be applied in a selector, such as a shift lever, installed on the center console, a steering switch provided on a steering, and so on. Additionally, this disclosure can also be applied in a function operation device of various vehicles, which is provided on an instrument panel, on a window-side arm rest on a door or the like, and near a rear seat. Furthermore, the input devices applied in this disclosure can be applied in general operation systems used for various transportation devices, various information terminals, and so on.

What is claimed is:

1. An input device in which an operation force in a direction along an imaginary operation plane is inputted, the input device comprising:
   at least two coil bodies that are respectively wound by a wire to which current is applied, and respectively have a coil side surface which is configured by the wire, along the operation plane, the at least two coil bodies being attached to a circuit board located underneath the at least two coil bodies and the operation plane being parallel to the circuit board;
   a holding body that holds the at least two coil bodies such that a winding direction axis of the wire in each of the at least two coil bodies is parallel to the operation plane, and such that an extension direction of the wire extending along the coil side surface is different from one another;
   at least two magnetic pole formation sections that respectively have an opposing face, which is respectively opposed to the coil side surface in a z-axial direction orthogonal to the operation plane, and respectively generate an electromagnetic force in a direction, which is different from one another, between each of the at least two magnetic pole formation sections and each of the at least two coil bodies by applying the current to the wire; and
   a mobile body that holds the at least two magnetic pole formation sections so as to have predetermined spacing between the opposing face and the coil side surface correspondingly, and is arranged so as to be movable relative to the holding body with a state where the opposing face is opposed to the coil side surface correspondingly,
   wherein each of the at least two coil bodies has an accommodation chamber on an inner periphery side of the wire which is wounded,
   the input device furthering comprising:
   a magnetic yoke section that is arranged in the accommodation chamber and is configured to converge, on the coil side surface, a magnetic flux generated by each of the at least two magnetic pole formation sections.

2. The input device according to claim 1, wherein:
   the at least two coil bodies include four coil bodies;
   two of the four coil bodies respectively have a first coil side surface as the coil side surface in which the wire extends in an x-axial direction along the operation plane; and
   other two of the four coil bodies respectively have a second coil side surface as the coil side surface in which the wire extends in a y-axial direction along the operation plane.

3. The input device according to claim 2,
   wherein the two of the four coil bodies are arranged in the x-axial direction and the other two of the four coil bodies are arranged in the y-axial direction.

4. The input device according to claim 3, wherein:
   two first coil side surfaces are arranged alternatively in the x-axial direction and the y-axial direction; and
   two second coil side surfaces are arranged alternatively in the x-axial direction and the y-axial direction.

5. The input device according to claim 2,
   wherein the four coil bodies are arranged in a cross shape by arranging the two in the x-axial direction and the other two in the y-axial direction.

6. The input device according to claim 1, wherein:
the at least two coil bodies include three coil bodies, which are arrayed in an x-axial direction or a y-axial direction along the operation plane;
a middle coil body located at a middle among the three coil bodies has a first coil side surface as the coil side-surface in which the wire extends in one of the x-axial direction and the y-axial direction; and
other two of the three coil bodies located at both sides of the middle coil body among the three coil bodies respectively have a second coil surface as the coil side surface in which the wire extends in an axial direction, which is another one of the x-axial direction and the y-axial direction different from a wire extension direction of the first coil side surface.

7. The input device according to claim 1, wherein:
the two coil bodies are arrayed in an x-axial direction or a y-axial direction along the operation plane;
one of the two coil bodies has a first coil side surface as the coil side surface in which the wire extends in the x-axial direction; and
the other of the two coil bodies has a second coil side surface as the coil side surface in which the wire extends in the y-axial direction.

8. The input device according to claim 6,
wherein a dimension of the coil side surface in one of the x-axial direction and the y-axial direction, in which the at least two coil bodies are arranged, is smaller than another dimension of the coil side surface in another of the x-axial direction and the y-axial direction.

9. The input device according to claim 8,
wherein the plurality of magnetic pole formation sections are integrated into one body such that the opposing face, which is opposed to the coil side surface respectively, is continuous.

10. The input device according to claim 1,
wherein the coil side surface is respectively arranged in a quadrangular shape, and each side of the quadrangular shape extends along an x-axis or a y-axis.

11. The input device according to claim 1,
wherein two magnetic yoke sections arranged in accommodation chambers of the at least two coil bodies, which are adjacent to each other, are connected to each other.

* * * * *